(12) United States Patent
Sawada et al.

(10) Patent No.: US 10,579,496 B2
(45) Date of Patent: Mar. 3, 2020

(54) INFORMATION PROCESSING DEVICE, INFORMATION PROCESSING PROGRAM, AND INFORMATION PROCESSING METHOD

(71) Applicant: OMRON Corporation, Kyoto-shi, Kyoto (JP)

(72) Inventors: Shigenori Sawada, Takatsuki (JP); Shinji Murayama, Otsu (JP); Tianbing Li, Osaka (JP)

(73) Assignee: OMRON Corporation, Kyoto-shi (JP)

( * ) Notice: Subject to any disclaimer, the term of this patent is extended or adjusted under 35 U.S.C. 154(b) by 203 days.

(21) Appl. No.: 15/786,645

(22) Filed: Oct. 18, 2017

(65) Prior Publication Data

US 2018/0217914 A1    Aug. 2, 2018

(30) Foreign Application Priority Data

Jan. 31, 2017 (JP) ................. 2017-015027

(51) Int. Cl.
  *G06F 15/173* (2006.01)
  *G06F 11/34* (2006.01)
  (Continued)

(52) U.S. Cl.
  CPC ...... *G06F 11/3495* (2013.01); *G05B 19/0428* (2013.01); *G05B 19/058* (2013.01);
  (Continued)

(58) Field of Classification Search
  CPC ... H04L 41/22; H04L 43/0811; G06F 11/3476
  (Continued)

(56) References Cited

U.S. PATENT DOCUMENTS

2013/0339515 A1\* 12/2013 Radhakrishnan ..... H04L 41/142
  709/224
2017/0068229 A1\* 3/2017 Yaoita ..................... G06F 11/32

FOREIGN PATENT DOCUMENTS

DE   102009024101 A1   10/2010
EP       2990896 A1    3/2016
JP    2015-176370 A   10/2015

OTHER PUBLICATIONS

The extended European search report dated Apr. 23, 2018 in a counterpart European patent application.

\* cited by examiner

*Primary Examiner* — Wing F Chan
*Assistant Examiner* — Andrew Woo
(74) *Attorney, Agent, or Firm* — Metrolex IP Law Group, PLLC

(57) ABSTRACT

An information processing device includes: a collection unit configured to collect an event log corresponding to an event generated in a control system including at least one network; an extraction and specification unit configured to extract at least one event log corresponding to an event generated arising from an identical factor from the collected event log, and to specify an event log representing the event generated arising from the identical factor in the at least one event log extracted; and an output unit configured to output the event log representing the event generated arising from the identical factor and event logs corresponding to other events generated arising from the identical factor while distinguishing the event log representing the event generated arising from the identical factor and the event logs corresponding to other events generated arising from the identical factor from each other.

13 Claims, 23 Drawing Sheets

| Event generation time | | Generation source | Content | Event code | |
|---|---|---|---|---|---|
| 2016/5/1 | 13:10:01 | PLC | [Severity] Link-off abnormality | 00000015 | ··· Abnormality X |
| 2016/5/1 | 13:10:02 | Coupler | [Severity] Communication synchronization abnormality | 00000016 | ··· Abnormality A |
| 2016/5/1 | 13:10:02 | Coupler | [Severity] Communication synchronization abnormality | 00000016 | ··· Abnormality E |
| 2016/5/1 | 13:10:03 | Functional unit | [Severity] Unit output synchronization abnormality | 00000015 | ··· Abnormality B |
| 2016/5/1 | 13:10:03 | Functional unit | [Severity] Unit output synchronization abnormality | 00000015 | ··· Abnormality C |
| 2016/5/1 | 13:10:03 | Functional unit | [Severity] Slave communication abnormality | 00000021 | ··· Abnormality D |
| 2016/5/1 | 13:10:03 | Functional unit | [Severity] Unit output synchronization abnormality | 00000015 | ··· Abnormality F |
| 2016/5/1 | 13:10:03 | Functional unit | [Severity] Unit output synchronization abnormality | 00000015 | ··· Abnormality G |
| 2016/5/1 | 13:10:03 | Functional unit | [Severity] Slave communication abnormality | 00000021 | ··· Abnormality H |
| ⋮ | ⋮ | ⋮ | ⋮ | ⋮ | |

(51) Int. Cl.

| | |
|---|---|
| *G05B 19/409* | (2006.01) |
| *G05B 19/05* | (2006.01) |
| *G05B 23/02* | (2006.01) |
| *G05B 19/042* | (2006.01) |
| *G06F 11/30* | (2006.01) |
| *H04L 12/24* | (2006.01) |
| *H04L 12/26* | (2006.01) |

(52) U.S. Cl.
CPC ....... *G05B 19/409* (2013.01); *G05B 23/0264* (2013.01); *G06F 11/3006* (2013.01); *G06F 11/3075* (2013.01); *G06F 11/3476* (2013.01); *H04L 41/069* (2013.01); *H04L 41/0622* (2013.01); *H04L 43/045* (2013.01); *G05B 2219/14055* (2013.01); *G06F 2201/86* (2013.01)

(58) Field of Classification Search
USPC .................................................. 709/223, 224
See application file for complete search history.

FIG. 5A

| Event generation time | | Generation source | Content | Event code | | |
|---|---|---|---|---|---|---|
| 2016/5/1 | 13:10:01 | PLC | [Severity] Link-off abnormality | 00000015 | ... | Abnormality X |
| 2016/5/1 | 13:10:02 | Coupler | [Severity] Communication synchronization abnormality | 00000016 | ... | Abnormality A |
| 2016/5/1 | 13:10:02 | Coupler | [Severity] Communication synchronization abnormality | 00000016 | ... | Abnormality E |
| 2016/5/1 | 13:10:03 | Functional unit | [Severity] Unit output synchronization abnormality | 00000015 | ... | Abnormality B |
| 2016/5/1 | 13:10:03 | Functional unit | [Severity] Unit output synchronization abnormality | 00000015 | ... | Abnormality C |
| 2016/5/1 | 13:10:03 | Functional unit | [Severity] Slave communication abnormality | 00000021 | ... | Abnormality D |
| 2016/5/1 | 13:10:03 | Functional unit | [Severity] Unit output synchronization abnormality | 00000015 | ... | Abnormality F |
| 2016/5/1 | 13:10:03 | Functional unit | [Severity] Unit output synchronization abnormality | 00000015 | ... | Abnormality G |
| 2016/5/1 | 13:10:03 | Functional unit | [Severity] Slave communication abnormality | 00000021 | ... | Abnormality H |
| ... | | | ... | ... | | |

FIG. 5B

| Event generation time | | Generation source | Content | Event code | | |
|---|---|---|---|---|---|---|
| 2016/5/1 | 13:10:01 | PLC | [Severity] Link-off abnormality | 00000015 | ... | Abnormality X |
| 2016/5/1 | 13:10:02 | Coupler | [Severity] Communication synchronization abnormality | 00000016 | ... | Abnormality A |
| 2016/5/1 | 13:10:02 | Coupler | [Severity] Communication synchronization abnormality | 00000016 | ... | Abnormality E |
| 2016/5/1 | 13:10:03 | Functional unit | [Severity] Unit output synchronization abnormality | 00000015 | ... | Abnormality B |
| 2016/5/1 | 13:10:03 | Functional unit | [Severity] Unit output synchronization abnormality | 00000015 | ... | Abnormality C |
| 2016/5/1 | 13:10:03 | Functional unit | [Severity] Slave communication abnormality | 00000021 | ... | Abnormality D |
| 2016/5/1 | 13:10:03 | Functional unit | [Severity] Unit output synchronization abnormality | 00000015 | ... | Abnormality F |
| 2016/5/1 | 13:10:03 | Functional unit | [Severity] Unit output synchronization abnormality | 00000015 | ... | Abnormality G |
| 2016/5/1 | 13:10:03 | Functional unit | [Severity] Slave communication abnormality | 00000021 | ... | Abnormality H |
| 2016/5/1 | 13:10:03 | Coupler | [Severity] Process data communication time out | 00000030 | ... | Abnormality I |
| 2016/5/1 | 13:10:03 | Coupler | [Severity] Process data communication time out | 00000030 | ... | Abnormality J |
| ... | | | ... | ... | | |

| Network | Address | Sub-network | Device type | Comment |
|---------|---------|-------------|-------------|---------|
| 01 | 01 | 02 | 000200 | Communication coupler |
| 01 | 01 | 03 | 000200 | Communication coupler |
| 02 | 11 | – | 000201 | Remote I/O device 1 |
| 02 | 12 | – | 000201 | Remote I/O device 2 |
| 03 | 21 | – | 000201 | Remote I/O device 3 |
| ⋮ | ⋮ | ⋮ | ⋮ | ⋮ |

| Variable name | Variable type | Reference address | Variable name |
|---------------|---------------|-------------------|---------------|
| Local_Input_01 | Bool | Local:02:00 | – |
| Local_Input_02 | Bool | Local:02:01 | – |
| ⋮ | ⋮ | ⋮ | ⋮ |
| Remote_Var_01 | Bool | 02:01 | Safety_Input_11 |
| Remote_Var_02 | Bool | 02:01 | Safety_Input_12 |
| ⋮ | ⋮ | ⋮ | ⋮ |

INFORMATION PROCESSING DEVICE, INFORMATION PROCESSING PROGRAM, AND INFORMATION PROCESSING METHOD

CROSS-REFERENCE TO RELATED APPLICATION

This application is based on Japanese Patent Application No. 2017-015027 filed with the Japan Patent Office on Jan. 31, 2017, the entire contents of which are incorporated herein by reference.

FIELD

The present technology relates to an information processing device, an information processing program, and an information processing method, for being aimed at a networking control system.

BACKGROUND

Recently, networking and multi-function of various devices used in a production site are improved with the progress of Information and Communication Technology (ICT). Specifically, there has been put into practical use a system in which a control device such as a programmable logic controller (PLC), an input/output (I/O) device such as a sensor and a relay, and an actuator such as an inverter and a motor driver are connected and integrated through a network.

Various log output functions are mounted on the control system such that a malfunction generated during a system configuration or a system running can be investigated ex post facto. For example, Japanese Patent Unexamined Application No. 2015-176370 discloses a control system that can easily recognize a state of the control device during generation of a factor of an event.

In the networking and multi-functionalized control system, the network itself and the device and unit connected to the network are correlated with each other, and in the case that some abnormal factor is generated, a large amount of logs caused by the factor are output in some cases. There is a demand for easily specifying the factor generated from the large amount of logs.

SUMMARY

According to one aspect, an information processing device includes: a collection unit configured to collect an event log corresponding to an event generated in a control system including at least one network; an extraction and specification unit configured to extract at least one event log corresponding to an event generated arising from an identical factor from the collected event log, and to specify an event log representing the event generated arising from the identical factor in the at least one event log extracted; and an output unit configured to output the event log representing the event generated arising from the identical factor and event logs corresponding to other events generated arising from the identical factor while distinguishing the event log representing the event generated arising from the identical factor and the event logs corresponding to other events generated arising from the identical factor from each other.

It may be preferable that the output unit displays only the event log representing each factor.

It may be preferable that the output unit outputs the event log corresponding to another event generated arising from the selected factor according to the selection of the event log representing one of the factors.

It may be preferable that the output unit hierarchically expresses the event log representing one of the factors and the event log corresponding to another event generated arising from the factor.

It may be preferable that the extraction and specification unit extracts the event logs in which generation times are close to each other in the collected event logs as the event log corresponding to the events generated arising from the identical factor.

It may be preferable that the extraction and specification unit extracts the event log representing the events generated arising from the identical factor from the event logs corresponding to the extracted events generated arising from the identical factor based on a network configuration of the control system.

It may be preferable that the event log includes a content of a generated event, a generation time of the event, and a generation source of the event.

It may be preferable that the event log is issued according to at least one of an abnormality of hardware constituting the control system, an abnormality of a network included in the control system, and an abnormality of an application executed by the control system.

According to another aspect, an information processing program executed by a computer connected to a control system including at least one network is provided. The information processing program causes a computer to execute the steps of: collecting an event log corresponding to an event generated in the control system including the at least one network; extracting at least one event log corresponding to an event generated arising from an identical factor from the collected event log; specifying an event log representing the event generated arising from the identical factor in the at least one event log extracted; and outputting the event log representing the event generated arising from the identical factor and event logs corresponding to other events generated arising from the identical factor while distinguishing the event log representing the event generated arising from the identical factor and the event logs corresponding to other events generated arising from the identical factor from each other.

According to still another aspect, an information processing method performed by an information processing device connected to a control system including at least one network is provided. The information processing method includes the steps of: collecting an event log corresponding to an event generated in the control system including the at least one network; extracting at least one event log corresponding to an event generated arising from an identical factor from the collected event log; specifying an event log representing the event generated arising from the identical factor in the at least one event log extracted; and outputting the event log representing the event generated arising from the identical factor and event logs corresponding to other events generated arising from the identical factor while distinguishing the event log representing the event generated arising from the identical factor and the event logs corresponding to other events generated arising from the identical factor from each other.

An embodiment can provide a function of facilitating the specification of the generated factor in the networking control system.

BRIEF DESCRIPTION OF THE DRAWINGS

FIG. 5A and FIG. 5B are diagrams each illustrating a problem of a networking and multi-functionalized control system;

FIG. 12 is a schematic diagram illustrating an example of a setting content of a network configuration of configuration information retained by a control system according to an embodiment;

FIG. 13 is a schematic diagram illustrating an example of a setting content of a variable setting of configuration information retained by a control system according to an embodiment;

FIG. 14A and FIG. 14B are diagrams each illustrating an example of a user interface screen displaying an event log provided by a control system according to an embodiment;

DETAILED DESCRIPTION

Figure 1:
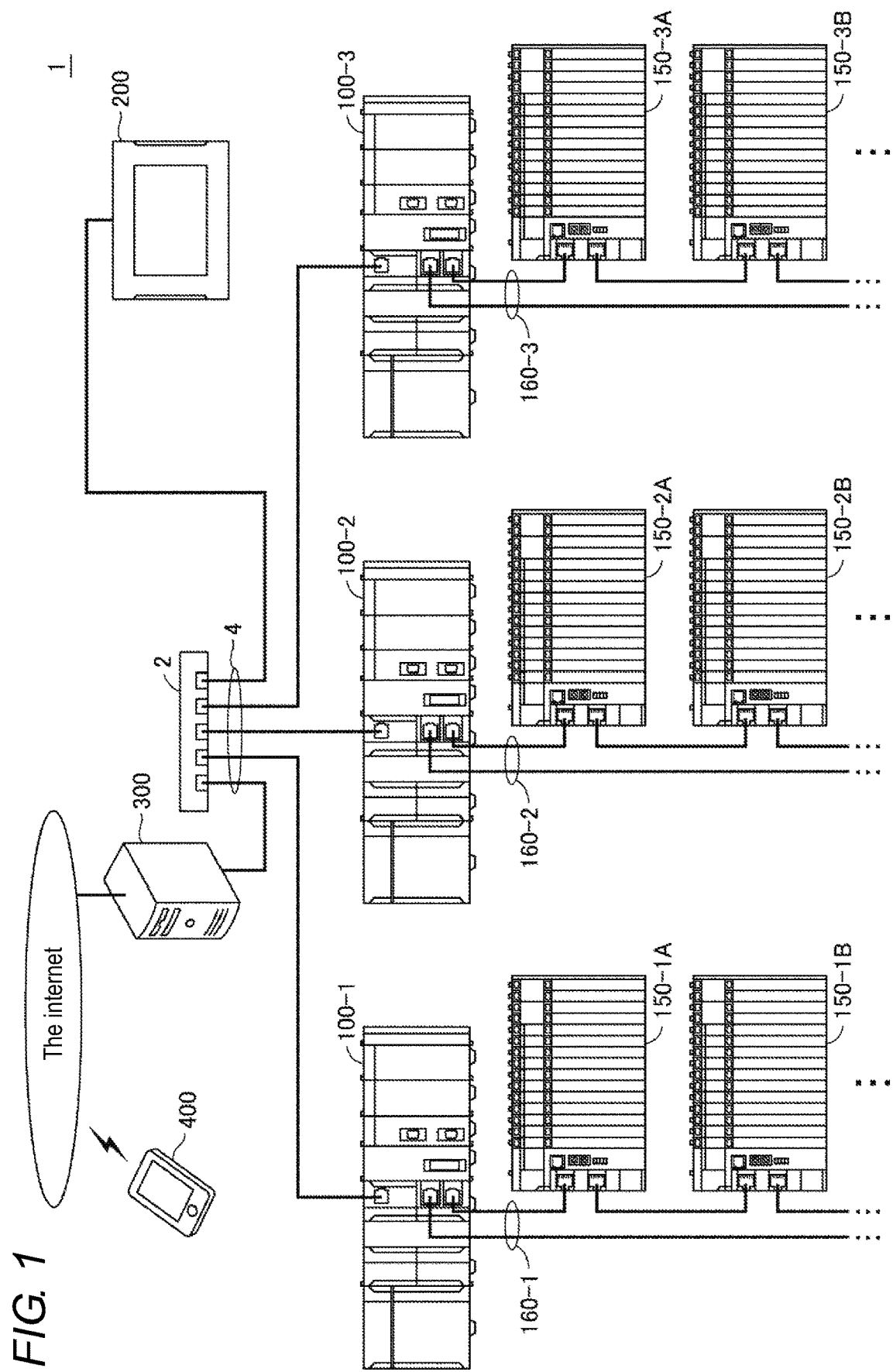
FIG. 1 is a schematic diagram illustrating a configuration example of a control system according to an embodiment.

Hereinafter, embodiments will be described in detail with reference to the drawings. In the drawings, the identical or equivalent component is designated by the identical numeral, and the overlapping description is omitted.

A. Configuration Example of Control System

A configuration example of a control system according to an embodiment will be described. FIG. 1 is a schematic diagram illustrating the configuration example of the control system according to an embodiment. Referring to FIG. 1, a control system 1 includes plural networks, and includes plural devices each of which is connected to one of the networks.

As an example, the control system 1 in FIG. 1 includes programmable logic controller (PLCs) 100-1 to 100-3 (hereinafter, also collectively referred to as a "PLC 100") that are of a typical example of the control device. The PLCs 100-1 to 100-3 are communicably connected to one another through a repeater 2 and a network 4. A programmable terminal 200 and a gateway server 300, which are of a typical example of the display device, are also connected to the network 4.

Although general EtherNet (registered trademark) may be adopted as the network 4, preferably a protocol in which a communication time is guaranteed between nodes in a network is adopted. For example, protocols such as EtherCAT (registered trademark) and EtherNet/IP (registered trademark) can be adopted as the protocol in which the communication time is guaranteed between nodes.

The PLCs 100-1 to 100-3 are connected to plural devices through field networks 160-1 to 160-3 ((hereinafter, also collectively referred to as a "field network 160"), respectively. For example, the PLC 100-1 is connected to remote I/O devices 150-1A and 150-1B. Similarly, the PLC 100-2 is connected to remote I/O devices 150-2A and 150-2B. Similarly, the PLC 100-3 is connected to remote I/O devices 150-3A and 150-3B.

A protocol in which a communication time is guaranteed between nodes in a network (that is, constant cycle communication is conducted) is preferably adopted as the field network 160. For example, protocols such as EtherCAT (registered trademark), EtherNet/IP (registered trademark), DeviceNet (registered trademark), and CompoNet (registered trademark) can be adopted. In each of the field networks 160, the PLC 100 acts as a master node that manages constant cycle communication. Hereinafter, in each network, a node except for the master node that manages the constant cycle communication of the network is also referred to as a "slave node".

A configuration of the control system 1 in FIG. 1 is described only by way of example. The control device may include any device (hereinafter, also collectively referred to as a "device") such as an input device such as an operation button, a sensor, a relay, a servo motor, and an inverter. A safety controller implementing a safety function of a control target and related machine and facility may be disposed as another example of the control device.

B. Device Configuration of Each Device

A device configuration of each device constituting the control system 1 will be described below.

(b1: PLC 100)

Figure 2:
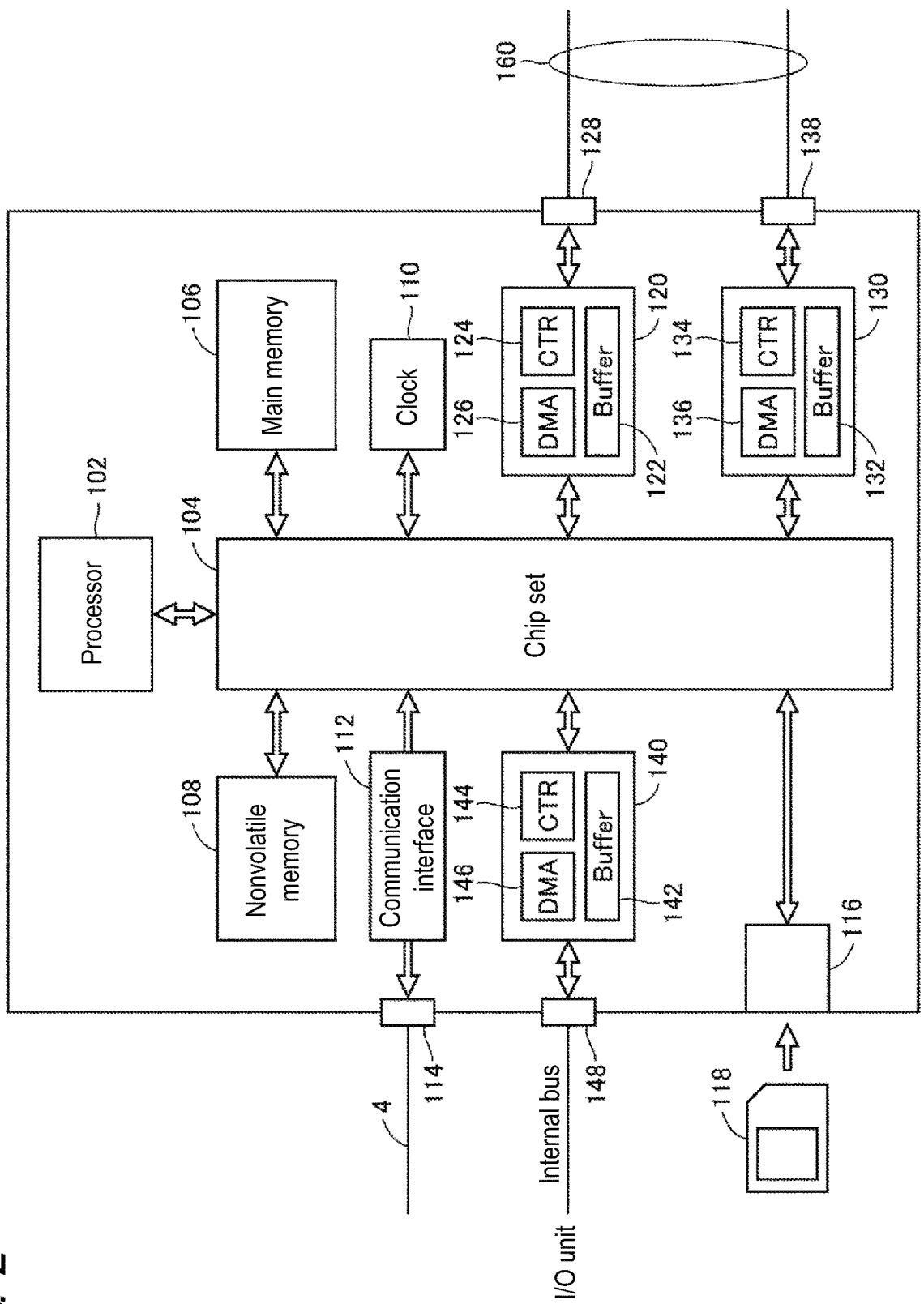
FIG. 2 is a schematic diagram illustrating a device configuration of a PLC of a control system according to an embodiment.

The PLC 100 in FIG. 1 is an example of the control device, and controls a control target such as a facility and a machine by executing a user program. FIG. 2 is a schematic diagram illustrating the device configuration of the PLC 100 of the control system 1 according to an embodiment.

Referring to FIG. 2, in the PLC 100, the control target is controlled by the execution of a previously-installed user program. Specifically, referring to FIG. 2, the PLC 100 includes a processor 102, a chip set 104, a main memory 106, a nonvolatile memory 108, a clock 110, a communication interface 112, a memory card interface 116, network controllers 120, 130, and an internal bus controller 140.

The processor 102 reads the user program stored in the nonvolatile memory 108, expands the user program in the main memory 106, and sequentially executes a command included in the user program according to a clock supplied from the clock 110. The main memory 106 is constructed with a dynamic random access memory (DRAM) or a static random access memory (SRAM), and is a storage device in which the user program and temporary data is retained. The nonvolatile memory 108 is constructed with a flash memory, and is a storage device in which the user program and various pieces of setting information are stored. The chip set 104 is a circuit that supports data exchange between the processor 102 and a peripheral device.

The communication interface 112 is a circuit that communicates with an external device such as another PLC 100 and the programmable terminal 200, and the communication interface 112 is physically connected to the network 4 through the connector 114.

A memory card 118 is attachable to the memory card interface 116, and the memory card interface 116 reads and writes data from and in the memory card 118.

The network controllers 120, 130 control exchange of the data with another device through the field network 160. The network controllers 120, 130 are physically connected to the field network 160 through connectors 128, 138. Specifically, the network controller 120 includes a buffer memory 122, a transfer control circuit 124, and a dynamic memory access (DMA) control circuit 126. Similarly, the network controller 130 includes a buffer memory 132, a transfer control circuit 134, and a DMA control circuit 136. The buffer memories 122, 132 sequentially store packets transferred through the field network 160. The transfer control circuit 124 controls transmission of the packet to the field network 160 and reception of the packet from the field network 160. The DMA control circuits 126, 136 control access to the buffer memory.

The internal bus controller 140 is physically connected to an internal bus through a connector 148, and mediates the data exchange with a functional unit installed in the PLC 100 through the internal bus. Specifically, the internal bus controller 140 includes a buffer memory 142, a transfer control circuit 144, and a DMA control circuit 146. The function of each of these units is identical to that corresponding to the network controllers 120, 130.

(b2: Safety Controller)

A device configuration of the safety controller is similar to that of the PLC 100. However, in the safety controller, a configuration in which a processor or a power supply is duplexed may be adopted in order to enhance a fault tolerance. Sometimes the functional unit is also duplexed or has a device configuration necessary for the safety function.

(b3: Remote I/O Device 150)

The remote I/O device 150 in FIG. 1 collects information indicating a state of the control target facility or machine, transfers the information to the control device such as the PLC 100 as input data, and outputs control output (hereinafter, also referred to as "output data") decided by calculation of the PLC 100 to the control target facility or machine as an instruction.

A device configuration of the remote I/O device 150 is similar to that of the PLC 100. However, in the remote I/O device 150, because the user program is not executed, the remote I/O device 150 may be constructed with a hard wired processing circuit such as an application specific integrated circuit (ASIC) and a field-programmable gate array (FPGA) instead of the processor.

The functional unit installed in the PLC 100 and the remote I/O device 150 is a device that exchanges various pieces of information with the control target facility or machine. For example, the functional unit has at least one of a digital input (DI) function of receiving a digital signal, a digital output (DO) function of outputting the digital signal, an analog input (AI) function of receiving an analog signal, and an analog output (AO) function of outputting the analog signal. Alternatively, the functional unit includes a special function in which proportional integral derivative (PID) control or motion control is mounted.

(b4: Programmable Terminal 200)

The programmable terminal 200 in FIG. 1 is an example of the information processing device connected to the control system 1, and provides a human machine interface (HMI) function for the control system 1. Specifically, the programmable terminal 200 present the user with various screens including necessary information in the information managed by the control system 1 according to previously-prepared information processing program, and outputs a designated instruction to a designated device in response to a user operation. The programmable terminal 200 may be connected to any one of devices constituting the control system 1. In the configuration example of FIG. 1, the programmable terminal 200 is accessible to the PLCs 100-1 to 100-3 through the repeater 2 and the network 4. Alternatively, the programmable terminal 200 may directly be connected to one of the PLCs 100.

Figure 3:
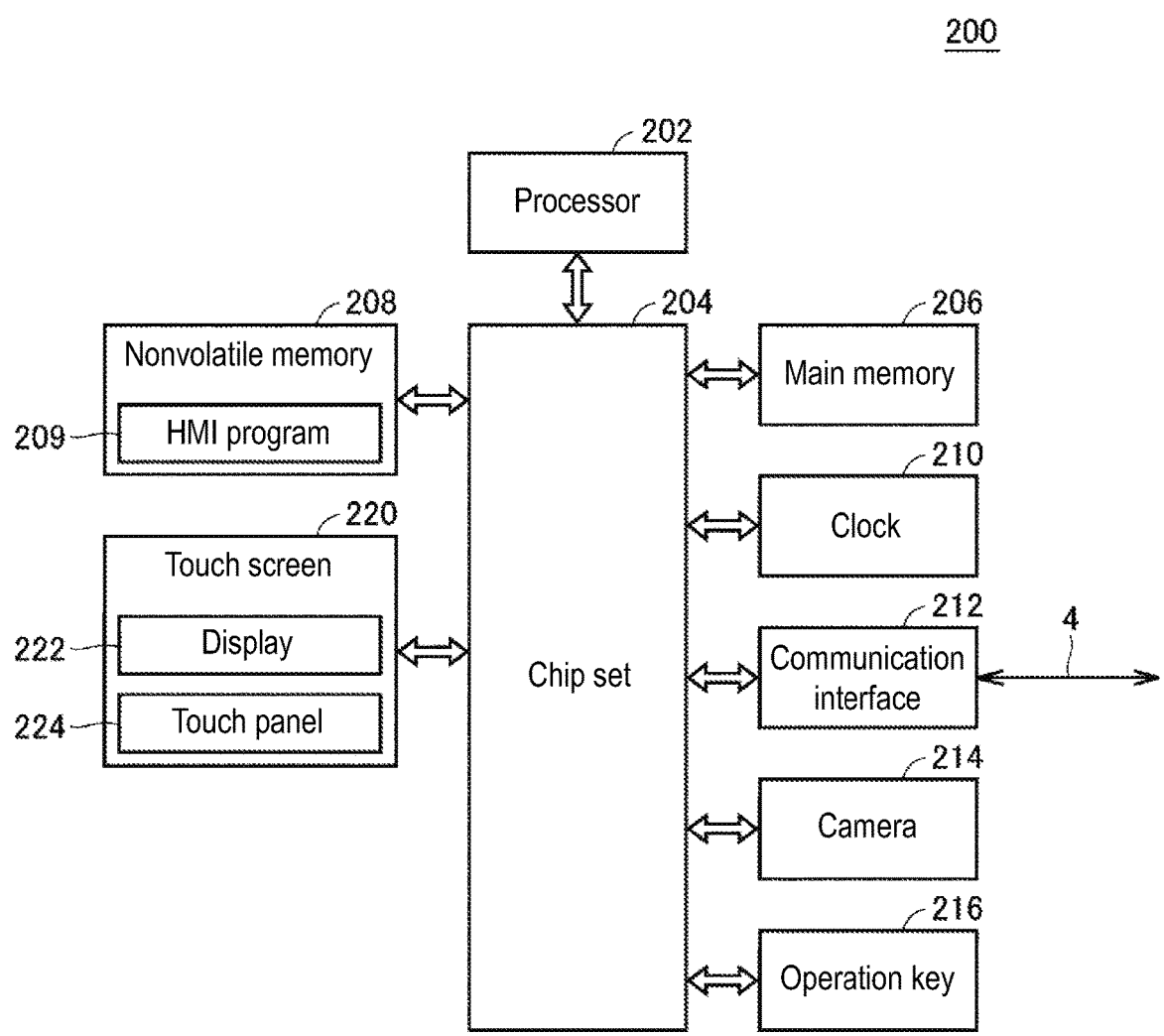
FIG. 3 is a schematic diagram illustrating a device configuration of a programmable terminal of a control system according to an embodiment.

FIG. 3 is a schematic diagram illustrating a device configuration of the programmable terminal 200 of the control system 1 according to an embodiment. Referring to FIG. 3, in the programmable terminal 200, by the execution of the previously-installed information processing program (hereinafter, also referred to as an "HMI program 209"), a user interface screen is provided while information processing (to be described later) is performed. Specifically, referring to FIG. 3, the programmable terminal 200 includes a processor 202, a chip set 204, a main memory 206, a nonvolatile memory 208, a clock 210, a communication interface 212, a camera 214, an operation key 216, and a touch screen 220.

The processor 202 reads the HMI program 209 stored in the nonvolatile memory 208, expands the HMI program 209 in the main memory 206, and sequentially executes a command included in the HMI program 209 according to the clock supplied from the clock 210. The main memory 206 is constructed with a DRAM or a SRAM, and is a storage device in which the HMI program 209 or temporary data is retained. The nonvolatile memory 208 is constructed with a flash memory, and is a storage device in which the HMI program 209 and various pieces of setting information are stored. The chip set 204 is a circuit that supports data exchange between the processor 202 and a peripheral device.

The communication interface 212 mediates communication with another device through the network 4.

The camera 214 is disposed on a surface of the programmable terminal 200 to image a user who uses the programmable terminal 200 or surroundings of the user. An image taken by the camera 214 may be used in user authentication.

The operation key 216 is disposed on a surface, a side surface, or a rear surface of the programmable terminal 200 to receive the user operation.

The touch screen 220 acts as a display that presents image for the user, and also acts as an input unit that receives the user operation. Specifically, the touch screen 220 includes a display 222 acting as the display and a touch panel 224 that is disposed on the surface of the display 222 to receive the user operation (that is, an operation to touch the display 222).

A part or all of the functions executed by the processor 202, may be implemented using a hard wired processing circuit such as an ASIC and an FPGA.

(b5: Gateway Server 300)

The gateway server 300 in FIG. 1 provides the HMI function for the control system 1 to a terminal device 400, such as a tablet, which exists outside the control system 1. The gateway server 300 is the information processing device that connects the network 4 of the control system 1 to the Internet, and provides information about the control system 1 to the terminal device 400 in response to the access from the terminal device 400. Generally the gateway server 300 is constructed with a computer having a general-purpose architecture, and a Web server function, a database function, and various security functions are mounted on the gateway server 300.

C. Problem

Each device constituting the control system 1 has a function of detecting generation of an abnormality in plural hierarchies. For example, functions of monitoring some abnormality that can be generated in hardware, some abnormality that can be generated in arithmetic execution of a processor (for example, a watchdog timer), some abnormality that can be generated in processing (data input and output processing) of updating a variable used in arithmetic processing, and some abnormality that can be generated in communication processing are mounted on each device constituting the control system 1.

The monitoring functions operate independently of each other, and operate independently in each device constituting the control system 1. Therefore, the networking and multi-functionalized control system detects plural abnormalities caused by an identical factor. A case that the plural abnormalities caused by an identical factor are detected will be described below.

FIGS. 4 to 8 are a schematic diagram illustrating a problem of the networking and multi-functionalized control system.

Figure 4:
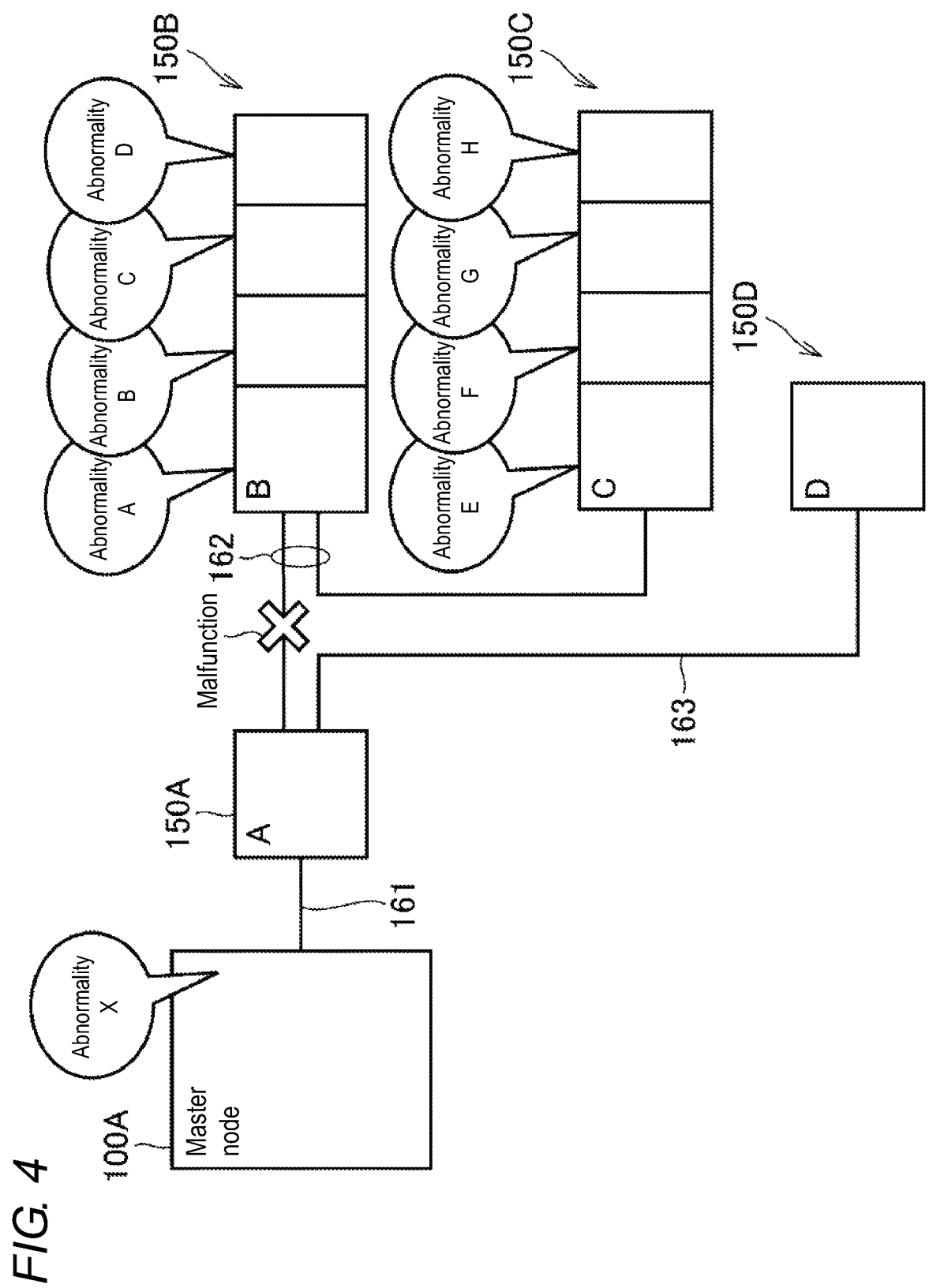
FIG. 4 is a schematic diagram illustrating a problem of a networking and multi-functionalized control system.

In the control system of FIG. 4, the remote I/O device 150A is connected to the PLC 100A through a network 161. Two networks 162 and 163 are connected to the remote I/O device 150. More specifically, a functional unit that communicates with the networks 162 and 163 is incorporated in a remote I/O device 150. The remote I/O devices 150B and 150C are connected to the network 162. On the other hand, a remote I/O device 150D is connected to the network 163.

In the network 161, a PLC 100A acts as the master node. In the networks 162 and 163, the remote I/O device 150A acts as the master node.

For example, in the control system 1 of FIG. 1, it is assumed that some malfunction is generated to break down the communication in the network 162 connecting the remote I/O devices 150A and 150B. In this case, because the PLC 100A cannot communicate with the remote I/O device 150G and the remote I/O device (in this case, the remote I/O device 150C) connected subsequent to the remote I/O device 150G, the PLC 100A detects the abnormality (communication abnormality), and generates an abnormal message or an event log (abnormality X).

In the remote I/O device 150A, a relay (communication coupler) that performs the communication processing through the network 162 detects the abnormality (communication abnormality), and generates the abnormal message or the event log (abnormality A). Each of the functional units (in the example of FIG. 4, three functional units) installed in the communication coupler also detects the abnormality (communication abnormality), and generates the abnormal message or the event log (abnormalities B to D).

In the remote I/O device 150B, similarly the relay (communication coupler) that performs the communication processing through the network 162 detects the abnormality (communication abnormality), and generates the abnormal message or the event log (abnormality E). Each of the functional units (in the example of FIG. 4, three functional units) installed in the communication coupler also detects the abnormality (communication abnormality), and generates the abnormal message or the event log (abnormalities F to H).

FIG. 5A illustrates an example of the event log generated in the control system of FIG. 4. In the example of FIG. 5A, an event generation time, an event source, a content of the generated event, and a corresponding event code are recorded. As illustrated in FIG. 5A, a series of event logs is simultaneously generated at an approximate time.

That is, a relationship is not monitored between the remote I/O devices 150A and 150B, and a relationship is not monitored between the functional units of the remote I/O devices. Resultantly, each device and each functional unit, which are connected to the network 162, independently detects the abnormality.

Particularly, because various functional units are installed in the communication coupler constituting the remote I/O device, the abnormal messages or event logs as many as the number of installed functional units are generated.

In the control system of FIG. 6, as an example, a logical connection (hereinafter, also referred to as "connection") 170 exists between the functional unit installed in the remote I/O device 150B and some functional units installed in the remote I/O device 150D.

As used herein, the "logical connection" of the network is a general term of a relationship in which one of different devices or functional units uses or refers to information retained by the other. The logical connection is performed in a layer of an application such as the user program or in layers above and below the application layer. Typically, the "logical connection" of the network includes a relationship in which data managed by another control device included in the control system is used in the user program executed by one of the control devices included in the control system. On the other hand, a "physical connection" of the network as used herein includes a real connection relationship of at least one network included in the control system.

Figure 7:
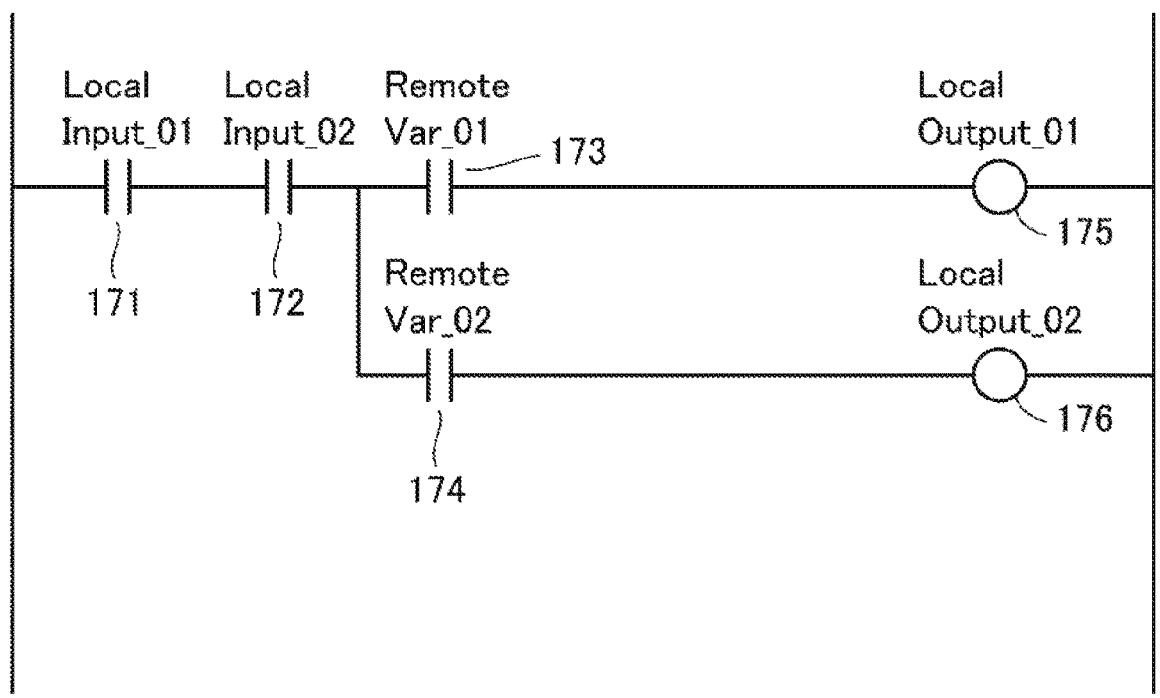
FIG. 7 is a schematic diagram illustrating a problem of a networking and multi-functionalized control system.

FIG. 7 illustrates an example of the application including the logical connection. For example, the program in a ladder form of FIG. 7 may be included as a part of the user program or system program executed by one of the functional units. The program is not limited to the ladder form, and any form may be adopted in the program. In the program, for example, final outputs 175, 176 are decided by a logical operation of local signals 171, 172 input to the functional unit that executes the program and remote signals 173, 174 managed by another functional unit.

In the program of FIG. 7, the arithmetic processing cannot be executed unless the remote signals 173, 174 exist. Therefore, in the case that a signal of a reference destination (connection destination) cannot be obtained, the abnormality may be generated as a program execution error.

Referring to FIG. 6 again, when some malfunction is generated in the network 162 connecting the remote I/O devices 150A and 150B while some connection is set between the devices or the functional units, compared with the case that the connection is not set (FIG. 4), the abnormality related to the connection is detected, and more abnormal messages or event logs are generated (abnormalities I and J).

Figure 6:
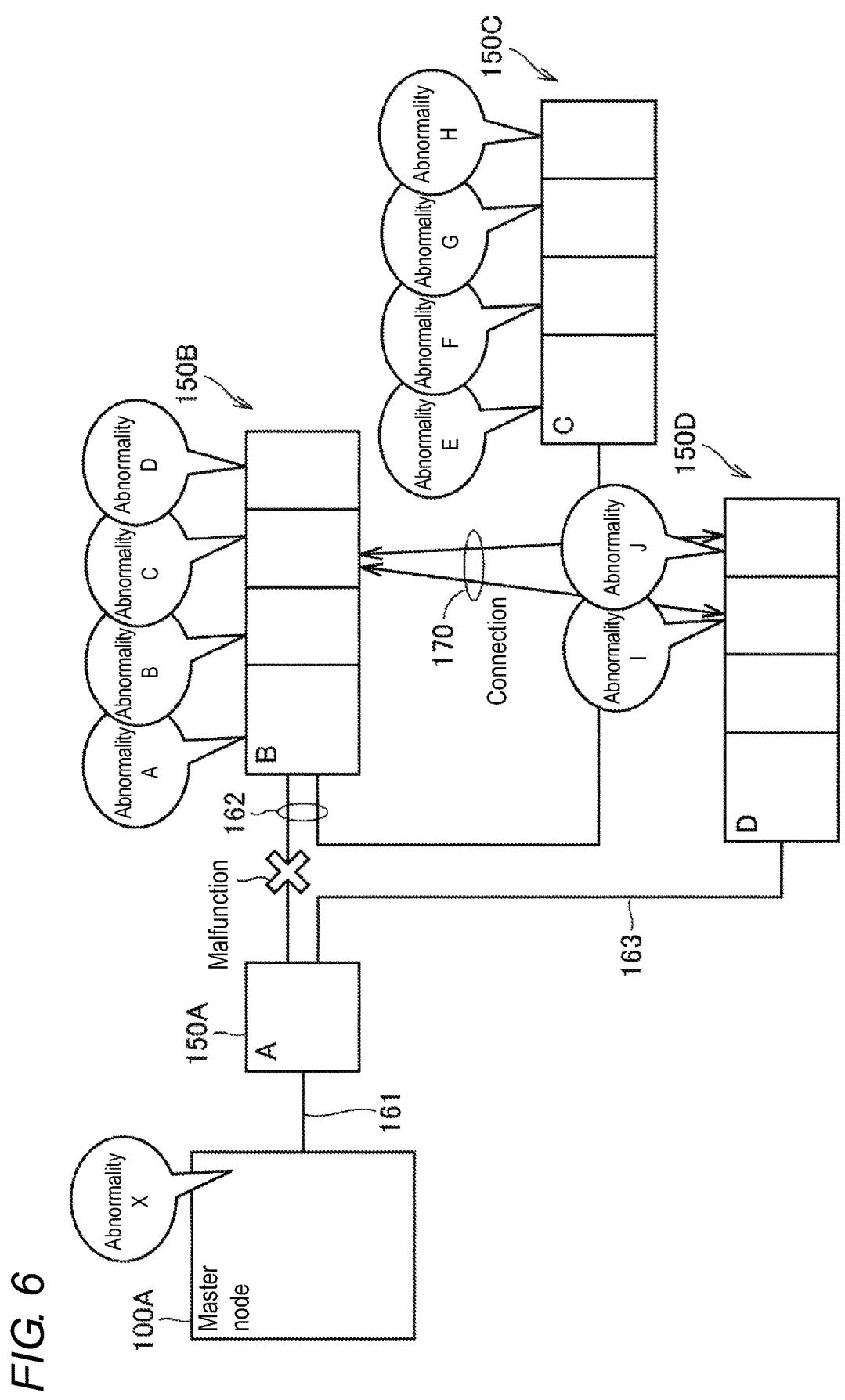
FIG. 6 is a schematic diagram illustrating a problem of a networking and multi-functionalized control system.

FIG. 5B illustrates an example of the event log generated in the control system of FIG. 6. In the example of FIG. 5B, more event logs corresponding to the abnormalities I and J are generated compared with the example of FIG. 5A.

Figure 8:
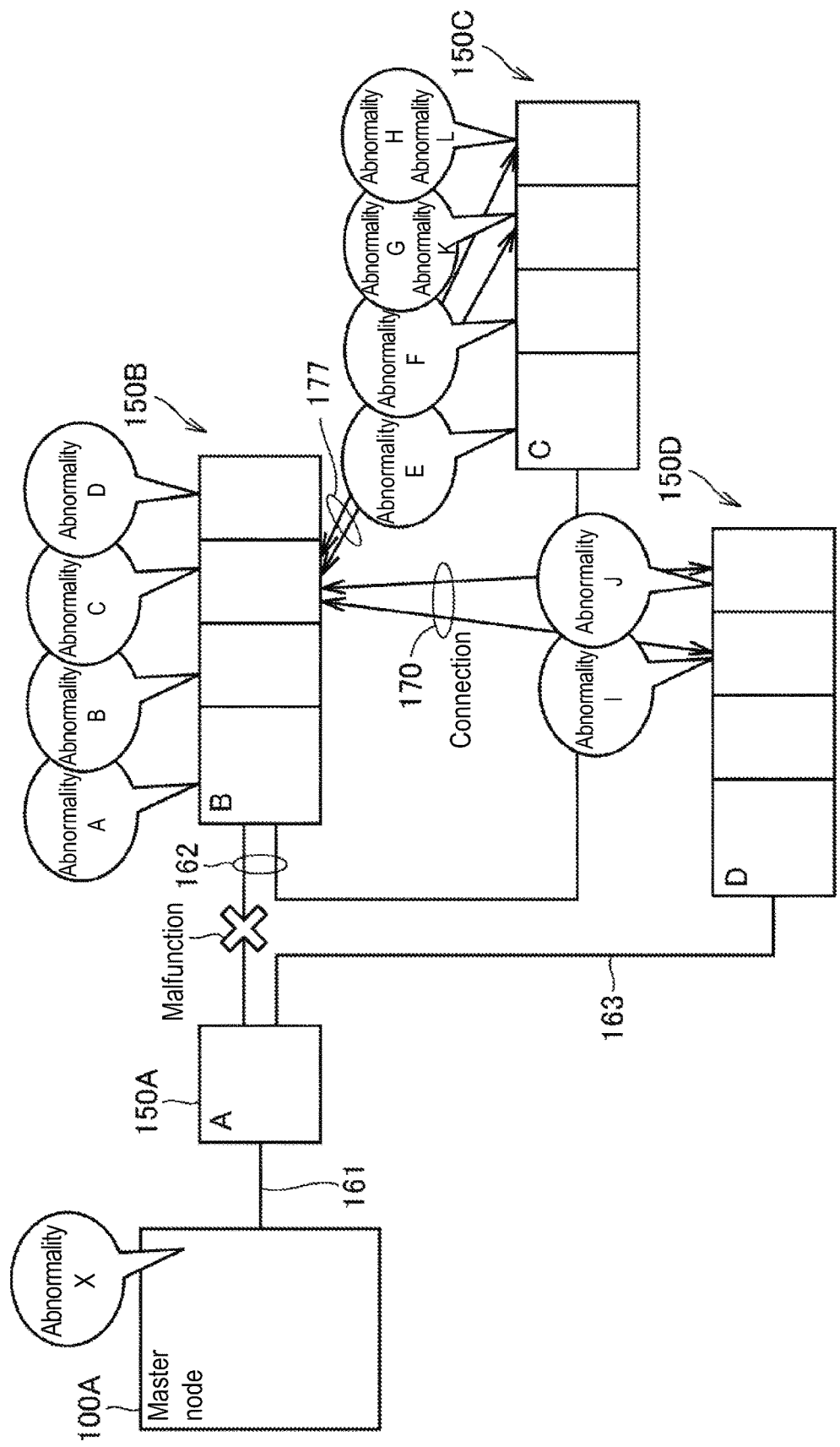
FIG. 8 is a schematic diagram illustrating a problem of a networking and multi-functionalized control system.

FIG. 8 illustrates a configuration example in which more connections are set compared with the program of FIG. 7. In the control system of FIG. 8, a connection 177 is set in addition to the connection 170. As illustrated in FIG. 8, when some abnormality is generated in the network while the more connections are set, more abnormalities are detected in relation to the connection, and the generated abnormal message or event log is increased (abnormalities K and L).

Thus, the plural abnormal messages or event logs may be generated arising from the identical factor in the networking and multi-functionalized control system. When the user has a sufficient expert knowledge to fully know the configuration of the control system, the user can determine that the abnormalities A to H are caused by the factor common to the factor causing the abnormality X from the time in which the abnormality X and other abnormalities are generated. Otherwise, there is a possibility of performing processing of investigating the cause of each of the abnormality X and the abnormalities A to H.

As illustrated in FIGS. 6 and 8, it is necessary to analyze the abnormal message or event log generated arising from some factor from the devices or functional units, in which the connection is set to each other, while a source program or a reference relationship is followed. In such situations, it is not easy to specify the factor of the generation of some abnormality.

D. Event Log Collection and Extraction Function

As described above, in the networking and multi-functionalized control system, the many abnormal messages or event logs are simultaneously generated arising from the identical factor, and it is difficult to specify the factor of the cause. Therefore, an embodiment provides a function (hereinafter, also referred to as an "event log collection and extraction function") of facilitating the specification of the generated factor in the networking control system.

Figure 9:
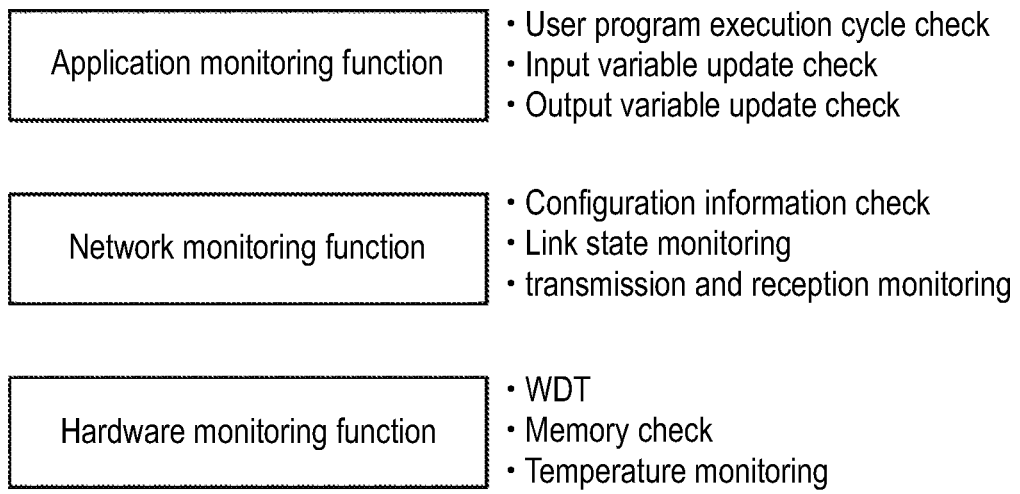
FIG. 9 is a schematic diagram illustrating an event monitoring function mounted on each device of a control system according to an embodiment.

FIG. 9 is a schematic diagram illustrating the event monitoring function mounted on each device of the control system according to an embodiment. Referring to FIG. 9, for example, a hardware monitoring function, a network monitoring function, and an application monitoring function may be mounted.

The hardware monitoring function is a function of monitoring a state of hardware (such as a processor and a memory) constituting each device or existence of the abnormality. For example, the hardware monitoring function is implemented using a watchdog timer (WDT), a memory check logic, and a temperature monitoring sensor.

The network monitoring function is a function of monitoring a state of the network connecting each device and another device or the existence of the abnormality. For example, the network monitoring function is implemented using logic such as check of consistency of the configuration information, connection state monitoring, and transmission and reception monitoring (such as a transmission data loss and ACK check).

The application monitoring function is a function of monitoring an error or abnormality generated in software executed by each device. For example, the application monitoring function is implemented using check of a user program execution cycle, check of an input variable update state, and check of an output variable update state.

Additionally, consistency of existence of a feedback signal corresponding to output of an instruction to a safety component may be checked in the safety controller.

FIG. 9 illustrates each monitoring function by way of example. All the monitoring functions are not necessarily mounted, and the monitoring function may appropriately be mounted according to performance required for the control system. Thus, the event log may be issued according to at least one of the abnormality of the hardware constituting the control system, the abnormality of the network included in the control system, and the abnormality of the application executed by the control system.

Figure 10:
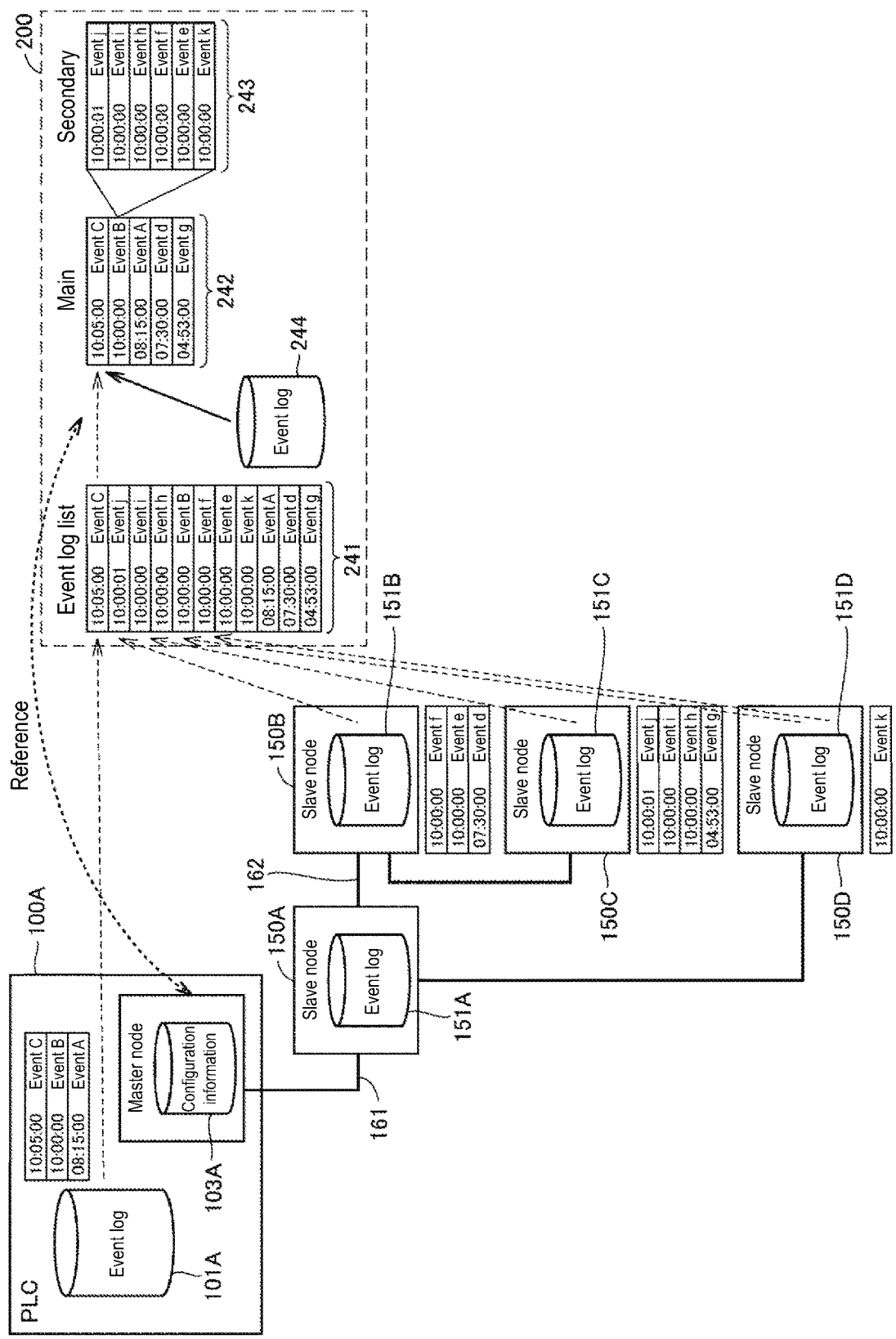
FIG. 10 is a schematic diagram illustrating an outline of an event log collection and extraction function in a control system according to an embodiment.

A function of collecting and extracting the event log generated by the event monitoring function will be described below. FIG. 10 is a schematic diagram illustrating an outline of the event log collection and extraction function in the control system according to an embodiment. FIG. 10 illustrates an example in which the event log collection and extraction function is mounted on the programmable terminal 200 based on the configuration example corresponding to the control system in FIG. 4.

Referring to FIG. 10, the PLC 100A has a function of detecting the state of the hardware of own device or an event, such as the abnormality and the malfunction, which is generated by the execution of the user program and a function of detecting an event of the abnormality generated in the network 161 as the master node or in each device connected to the network 161. An event log 101A is generated according to the abnormality detected by the PLC 100A.

Even in each of the remote I/O devices 150A to 150D that are of the slave node connected to the network, event logs 151A to 151D are generated in the case that the abnormality generated in the own device or the abnormality generated in the network is detected.

The programmable terminal 200 collects the event logs 101A, 151A to 151D. That is, the programmable terminal 200 collects the event log corresponding to the event generated in the control system including at least one network as the event log collection and extraction function. The programmable terminal 200 can collect the event log to detect the event of the abnormality or the malfunction, which is generated in the control system including at least one network. The programmable terminal 200 may collect the event log by accessing each device constituting the control system, or each device constituting the control system may transfer the event log to the programmable terminal 200 to collect the event log. As used herein, the "collection of the event log" includes not only the case that a collecting subject voluntarily obtains the event log but also the case that the event log transmitted from another subject is passively received.

The programmable terminal 200 extracts at least one event log corresponding to the event generated arising from the identical factor from a collected event log set 241 as the event log collection and extraction function. Additionally, the programmable terminal 200 specifies the event log representing the events caused by the identical factor in the at least one event log extracted.

More specifically, the programmable terminal 200 groups the event logs having the identical factor in the plural event logs by referring to the time each event log is generated and configuration information 103A (typically, retained by the master node of the network) about the network. For example, the event logs caused by some common factor are classified as a main event log 242 in the plural event logs, and the event logs that are generated secondarily arising from the identical factor are classified as a secondary event log 243. The user interface screen (to be described later) is provided based on a relationship between the main event log 242 and the secondary event log 243, which are classified arising from the identical factor. The main event log corresponds to the event representing the plural events generated arising from the identical factor, and preferably the event log effective in specifying the factor is selected.

Figure 11:
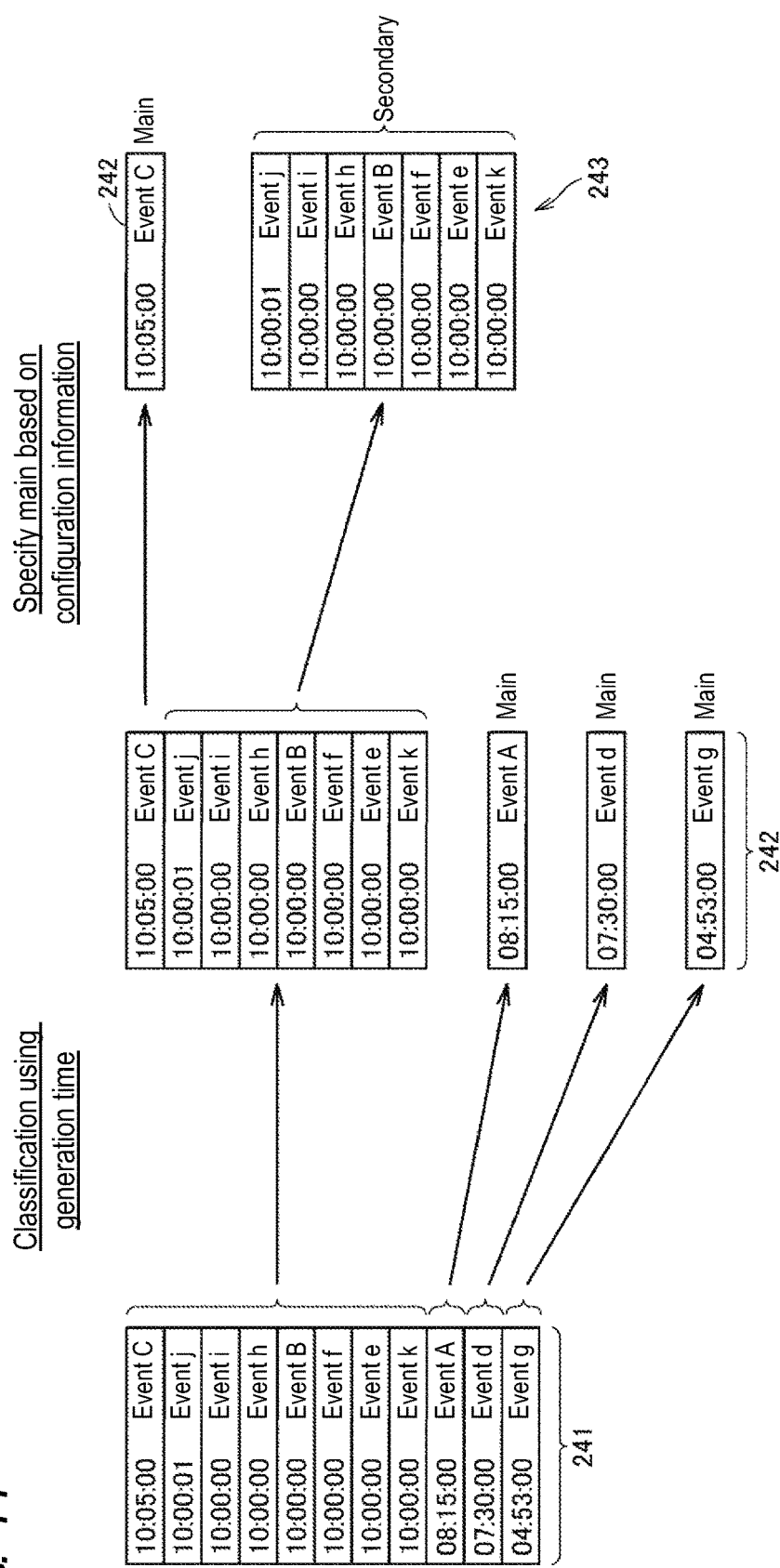
FIG. 11 is a schematic diagram illustrating a processing example of an event log collection and extraction function in a control system according to an embodiment.

FIG. 11 is a schematic diagram illustrating a processing example of the event log collection and extraction function in the control system according to an embodiment. Referring to FIG. 11, the event logs of the collected event log set 241 are classified using the generation time. The event log collection and extraction function extracts the event logs in which the generation times are close to each other in the collected event log set 241 as the event log corresponding to the events generated arising from the identical factor. For example, the event logs in which a difference of the generation time falls within a predetermined time (for example, 1 to 2 seconds) are grouped, and each group is produced. The group including only one event log is directly decided as the main event log 242.

On the other hand, for the group including the plural event logs, for example, by referring to the configuration information, the event log generated in the upper network is decided as the main event log 242 in the event logs included in the group, and other event logs are decided as the secondary event log 243. Thus, in the event log collection and extraction function, based on the network configuration of the control system, the event log representing the events generated arising from the identical factor is extracted from the event logs corresponding to the extracted events generated arising from the identical factor.

The event logs are managed together with the information indicating the main event log 242 and the secondary event log 243.

An example of the configuration information 103A retained by the PLC 100A will be described below. FIG. 12 is a schematic diagram illustrating an example of a setting content of a network configuration of the configuration information 103A retained by the control system according to an embodiment. FIG. 13 is a schematic diagram illustrating an example of a setting content of a variable setting of the configuration information 103A retained by the control system according to an embodiment.

A connection relationship of the networks included in the control system and the device connected to the network are defined using the configuration information 103A in FIG. 12. Specifically, identification information 1031 about the network and an address 1032 are defined while correlated with each device connected to the network. Because some devices constitute a sub-network, identification information 1033 about the sub-network is defined while correlated with the device constituting the sub-network. A device type 1034 indicating a type of each device and a comment 1035 are defined. The network physical connection can be understood by referring to the configuration information 103A.

Whether a setting content of the configuration information 103A is matched with the real physical connection is monitored, and a determination of a configuration abnormality may be made when the setting content of the configuration information 103A is not matched with the real physical connection.

The logical connection (connection) included in the control system is defined using the configuration information 103A in FIG. 13. Specifically, the logical connection includes a variable definition 1036 designating a variable name used in the user program, a variable type definition 1037 indicating a data type of the corresponding variable, and a reference address 1038 indicating a position of the device allocated to the corresponding variable. In the case that the corresponding variable is a value obtained from the device on the device that executes the user program, information specifying the functional unit installed in the device is set to the reference address 1038. On the other hand, in the case that the corresponding variable is a value obtained from the device installed on another device in the network, a variable name that can be used in the device of the reference destination or the network is designated in a corresponding variable definition 1039.

The connection can be set in the control system by correlating a local variable and a remote variable to each other in the configuration information 103A as illustrated in FIG. 13.

E. User Interface Screen

An example of the user interface screen provided by the programmable terminal 200 will be described below using the event log collection and extraction function.

(e1: Display of Event Log)

An example of the display according to the type of the plural event logs, which are caused by the identical factor while extracted by the event log collection and extraction function, will be described first. FIG. 14 is a view illustrating an example of the user interface screen representing the event log provided by the control system according to an embodiment.

Figure 14A:

As illustrated in FIG. 14A, a user interface screen 550 including a list of a main event log 552 is provided according to the user operation. When one of the main event logs is selected in the user interface screen 550, in the case that the secondary event log correlated with the selected main event log exists, a secondary event log 554 correlated with the selected event log is pulled down and displayed as illustrated in FIG. 14B.

As illustrated in FIGS. 14A and 14B, the programmable terminal 200 outputs the event log representing the event generated arising from the identical factor and the event log corresponding to another event generated arising from the identical factor while distinguishing the event logs from each other as an information output function. That is, as illustrated in FIG. 14A, only the event log representing each factor may be displayed as an initial state. Subsequent to the initial state, as illustrated in FIG. 14B, the event log corresponding to another event generated arising from the selected factor may be output according to the selection of the event log representing one of the factors. At this point, as illustrated in FIG. 14B, the event log (main event log) representing the selected factor and the event log (secondary event log) corresponding to another event generated arising from the selected factor may be expressed in a hierarchical manner. Alternatively, the main event log and the secondary event log may be different from each other in a display mode (such as a character size, a character color, and a font type).

When the user interface screen in which the event logs are displayed while divided into two stages is provided, even if the many event logs are generated arising from the identical factor, the generated event logs can be organized, and facilitation of the cause investigation can be achieved.

(e2: Display of Physical Connection and Logical Connection of Control System)

Figure 15:
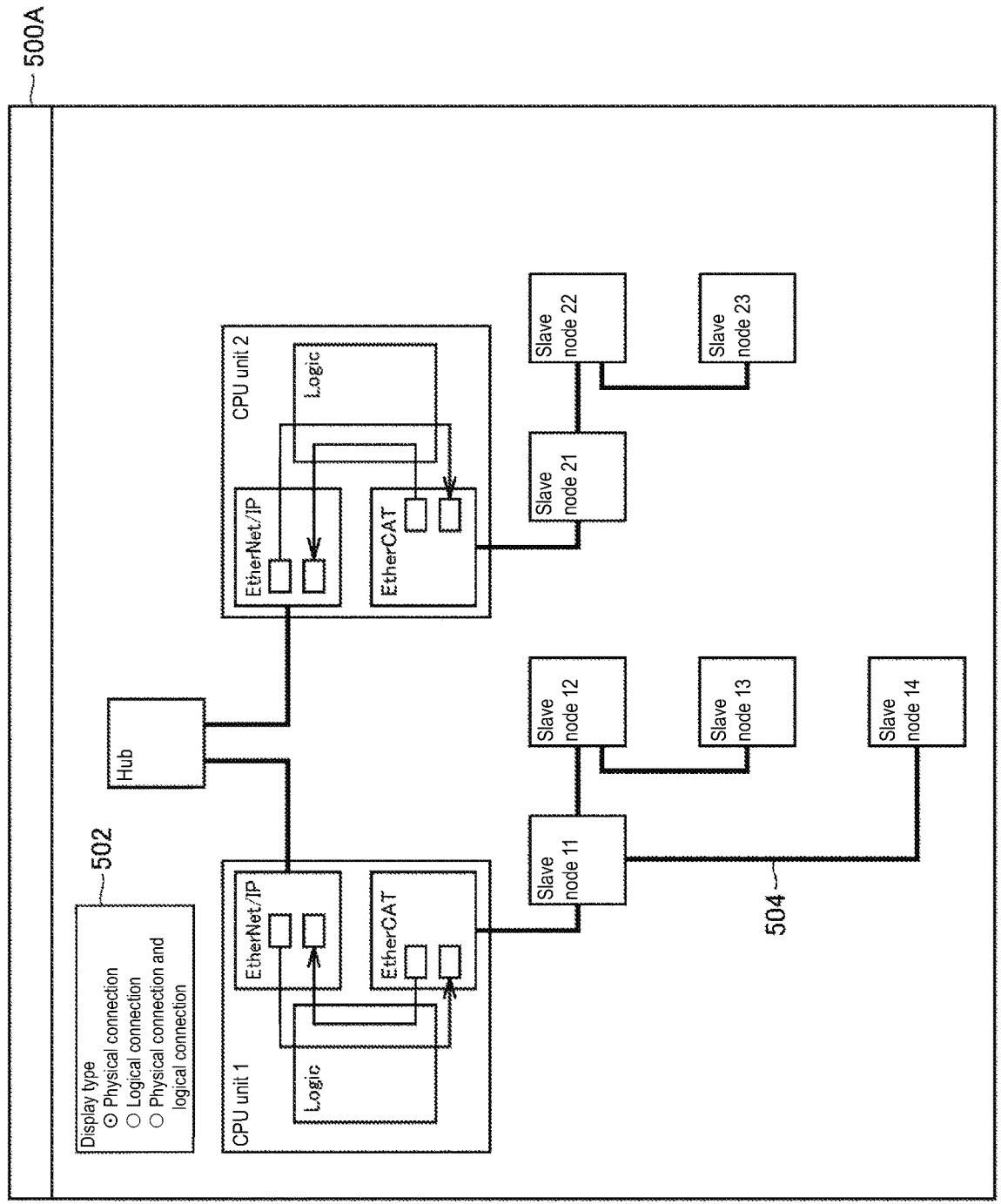
FIG. 15 is a view illustrating an example of a user interface screen displaying control system physical connection provided by a control system according to an embodiment.
Figure 16:
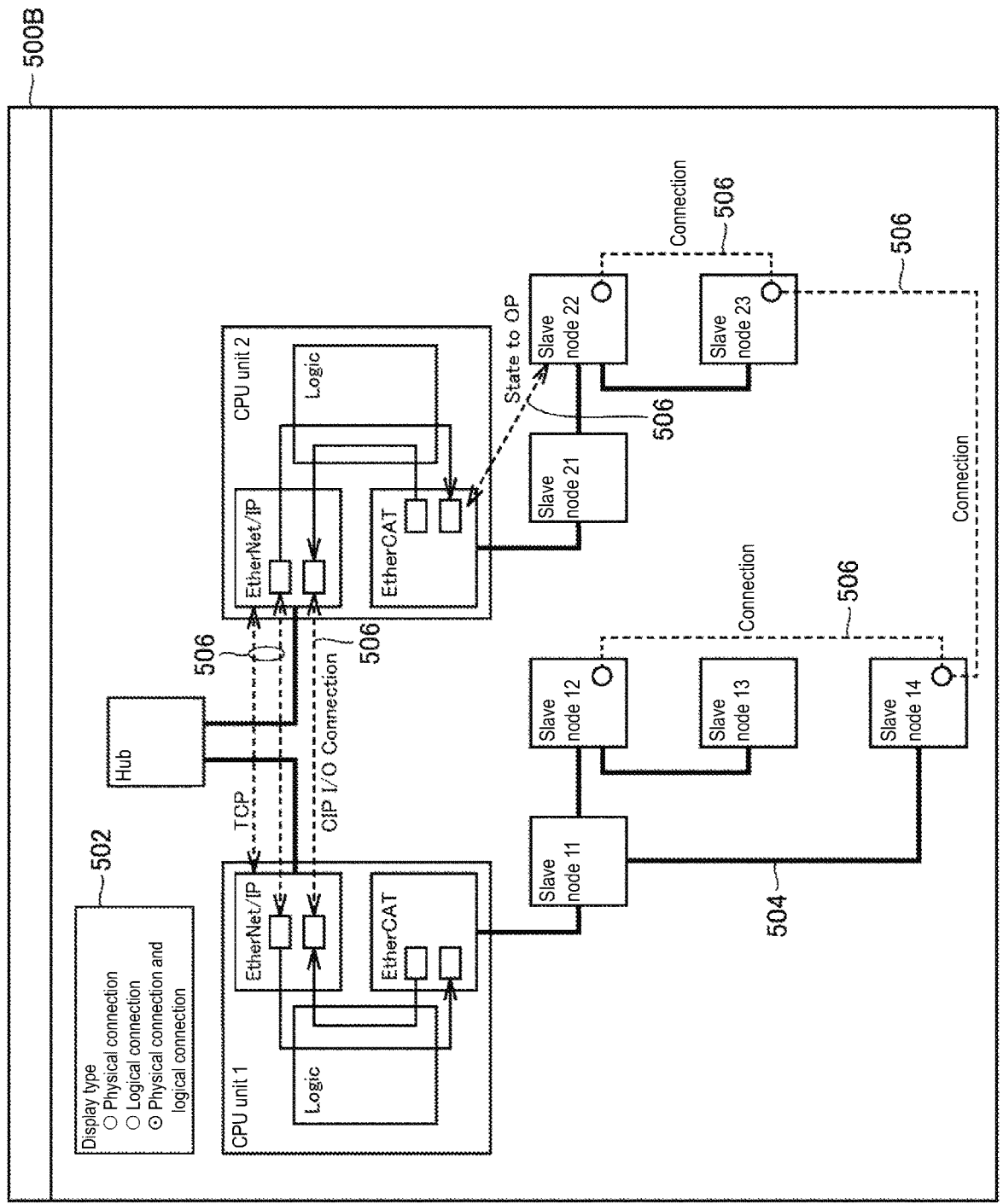
FIG. 16 is a view illustrating an example of a user interface screen displaying control system physical connection and logical connection provided by a control system according to an embodiment.

The user interface screen displaying control system physical connection and logical connection will be described below. FIG. 15 is a view illustrating an example of the user interface screen representing the control system physical connection provided by the control system according to an embodiment. FIG. 16 is a view illustrating an example of the user interface screen representing the control system physical connection and logical connection provided by the control system according to an embodiment.

In a user interface screen 500A of FIG. 15, each device constituting the target control system is schematically illustrated, and a physical connection 504 provided between the devices is also illustrated. In a user interface screen 500B of FIG. 16, each device constituting the target control system is schematically illustrated, and a logical connection 506 is also visualized in addition to the physical connection 504 provided between the devices.

The user interface screens 500A and 500B include a display switch dialog 502, and one of only the "physical connection", only the "logical connection", and a combination of the "physical connection" and the "logical connection" is arbitrarily selected in response to the user selection for the display switch dialog 502. That is, FIG. 15 illustrates an example in which only the "physical connection" is selected, and FIG. 16 illustrates an example in which the combination of the "physical connection" and the "logical connection" is selected.

As illustrated in FIGS. 15 and 16, the programmable terminal 200 visually expresses the network physical connection and logical connection, which are included in the control system, as a function of expressing the connection configuration. The visual expression of the physical connection and logical connection in FIGS. 15 and 16 is implemented based on the configuration information in FIGS. 12 and 13. At this point, the programmable terminal 200 may visually express one of or both the network physical connection and the network logical connection in response to the user selection for the display switch dialog 502. As illustrated in the following drawings, the programmable terminal 200 notifies the user of the event generated in the control system using the visual expression in FIGS. 15 and 16.

(e3: Display of Event Generated in Control System)

Figure 17:
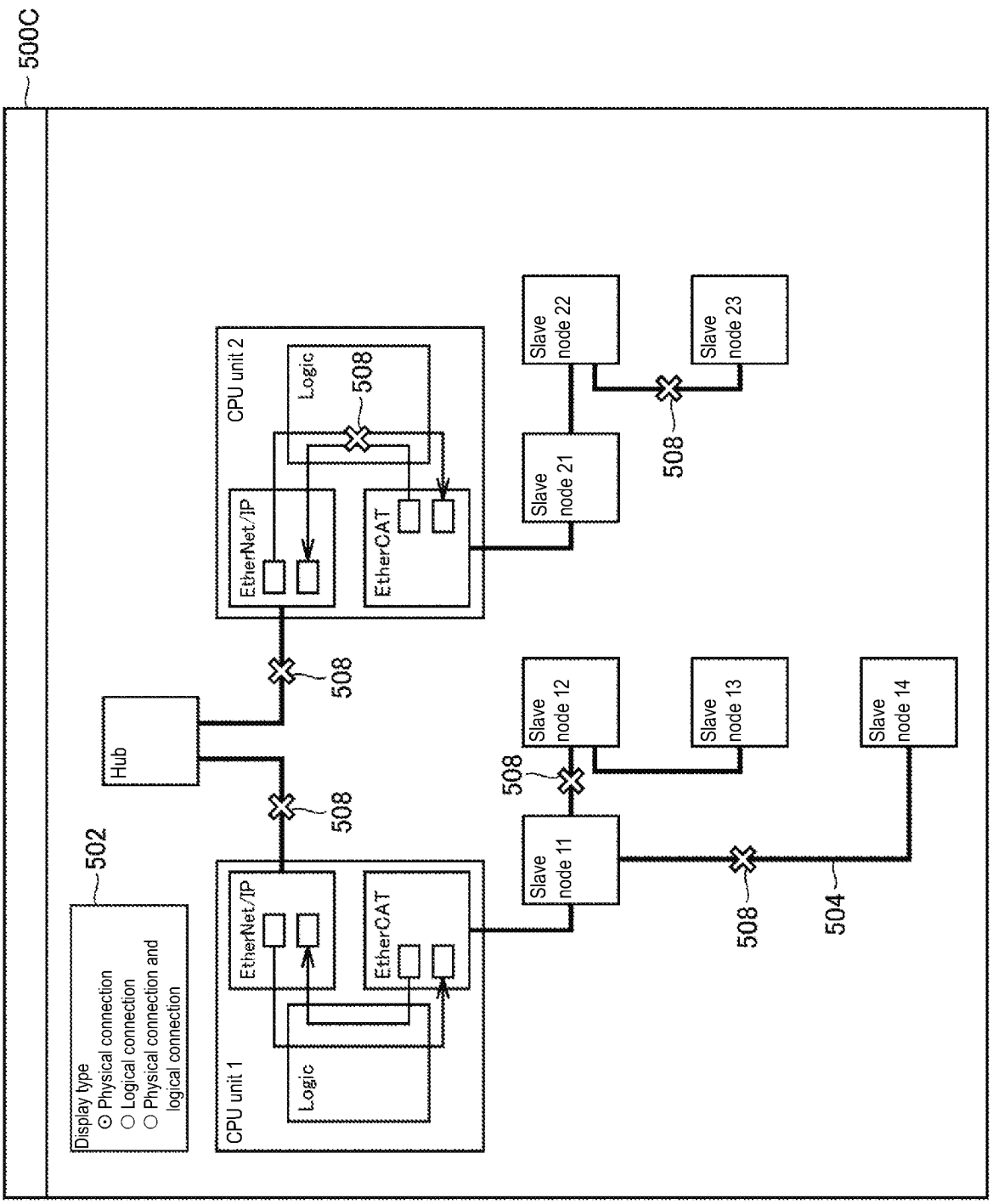
FIG. 17 is a view illustrating an example in which a generated event is displayed while correlated with a user interface screen, such as in FIG. 15.
Figure 18:
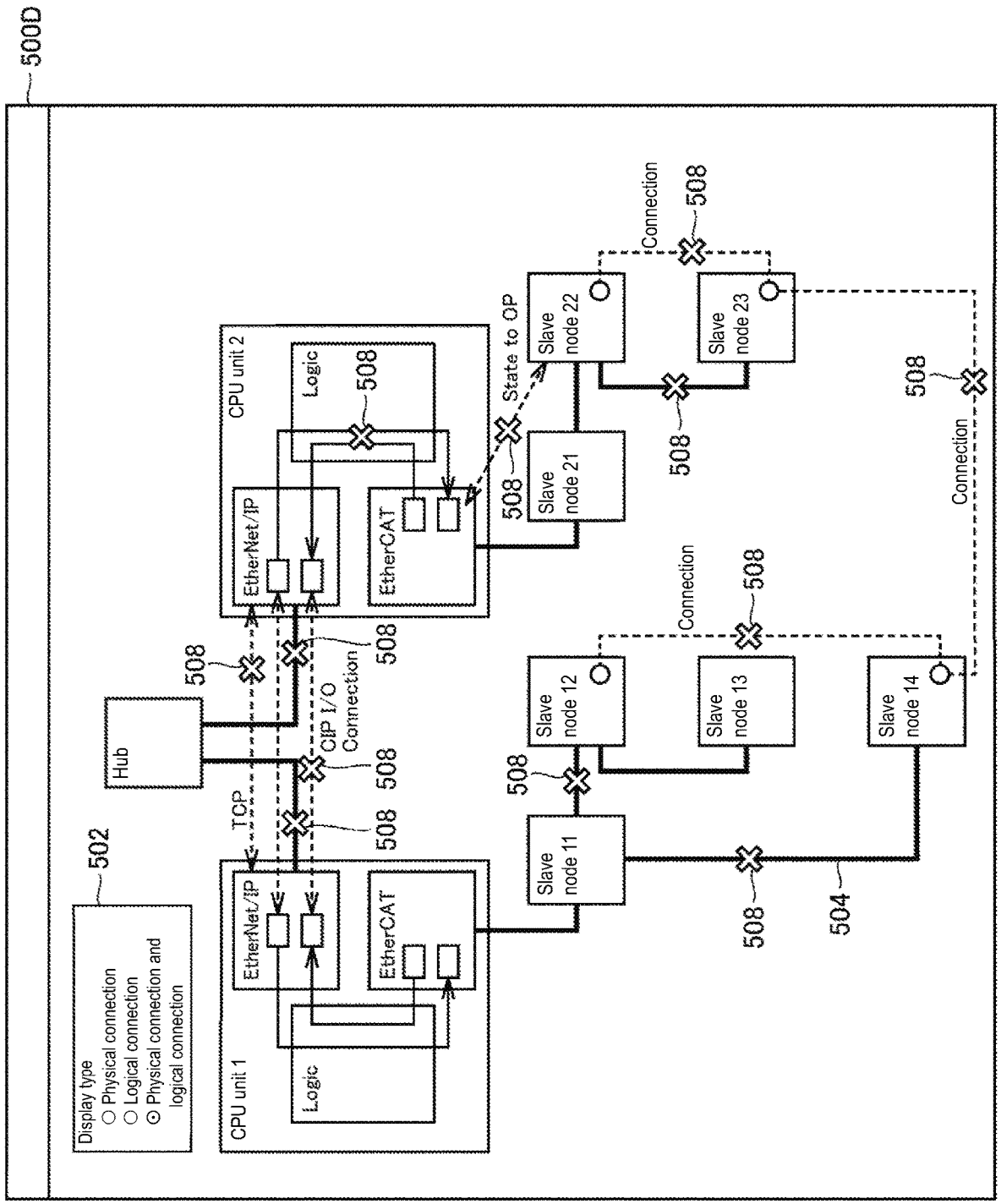
FIG. 18 is a view illustrating an example in which a generated event is displayed while correlated with a user interface screen, such as in FIG. 16.

A configuration example that visually displays the event log collected by the event log collection and extraction function will be described below. FIG. 17 is a view illustrating an example in which the generated event is displayed while correlated with the user interface screen in FIG. 15. FIG. 18 is a view illustrating an example in which the generated event is displayed while correlated with the user interface screen in FIG. 16.

A user interface screen 500C in FIG. 17 corresponds to display in which each collected event log is overlaid on the user interface screen 500A in FIG. 15 while correlated with an event log generation position. A user interface screen 500D in FIG. 18 corresponds to display in which each collected event log is overlaid on the user interface screen 500B in FIG. 16 while correlated with the event log generation position. In both the user interface screens in FIGS. 17 and 18, a malfunction object 508 indicating the generated event is displayed while correlated with the generation position.

As illustrated in FIGS. 17 and 18, the programmable terminal 200 outputs the detected event while correlating the detected event with the visually-expressed network physical connection and logical connection according to an event generation place as a function of outputting the event. Thus, the generated event such as the abnormality is displayed while correlated with the network physical connection and logical connection, which are included in the control system. Therefore, which region should be checked can easily be specified in order to specify the factor.

(e4: Pursuit of Factor of Abnormality Generated in Control System)

An example that visually displays a relationship of the event logs determined to be the identical factor by the event log collection and extraction function will be described below.

Figure 19:
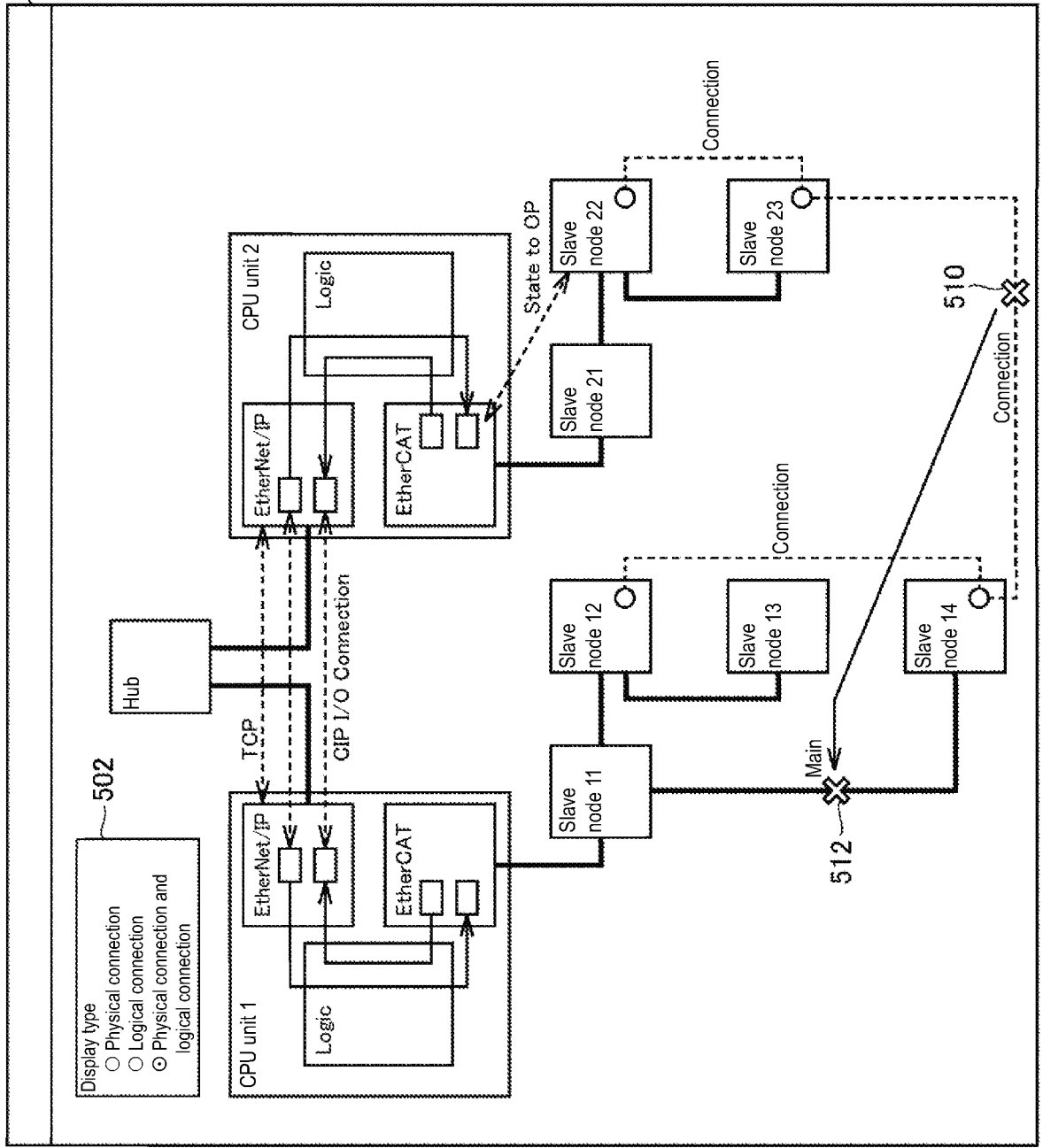
FIG. 19 is a view illustrating an example of a user interface screen visually displaying relevance between events provided by a control system according to an embodiment.

FIG. 19 is a view illustrating an example of the user interface screen visually representing relevance between events provided by the control system according to an embodiment. In the case that one of malfunction objects 510 is selected in a user interface screen 500E in FIG. 19, a malfunction object 512 indicating the correlated main event log is displayed while correlated with the event log generation position when the event log correlated with the selected malfunction object 510 is secondary.

In the case that the plural event logs are generated arising from the identical factor, the provision of the user interface screen can facilitate the investigation of the true cause while the user is not aware of the main event log and the secondary event log in the plural event logs.

Figure 20:
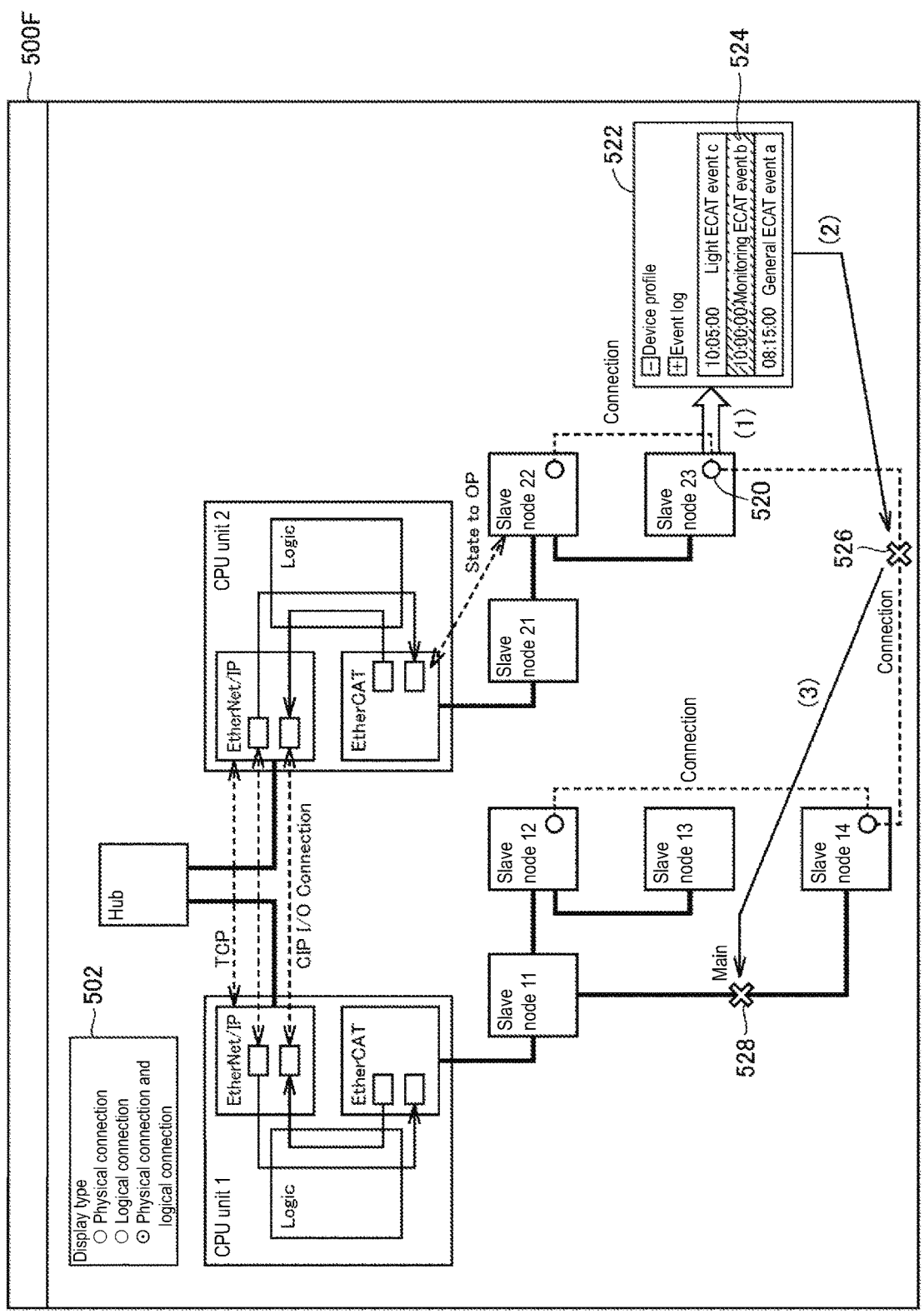
FIG. 20 is a view illustrating an example of a user interface screen facilitating a survey of a generated event log provided by a control system according to an embodiment.

FIG. 20 is a view illustrating an example of the user interface screen facilitating a survey of the generated event log provided by the control system according to an embodiment. An event list 522, which indicates the event generated in the device or is correlated with the device, is displayed when the user selects one (in the example of FIG. 20, an object 520) of devices in a user interface screen 500F of FIG. 20. Thus, in response to one of the selection of the objects, the programmable terminal 200 displays the event log correlated with the selected object as the function of outputting the event.

When one of the event logs displayed in the event list 522 is selected, a corresponding malfunction object 526 is displayed while correlated with the event log generation region. In the case that the malfunction object 526 is selected, a malfunction object 528 indicating the correlated main event log is displayed while correlated with the event log generation position when the event log correlated with the selected malfunction object 526 is secondary. Thus, in response to the selection of one of the event logs, the programmable terminal 200 extracts the event log representing the event caused by the same factor as the selected event log and visually indicates the place where the event corresponding to the extracted event log is generated as the function of outputting the event.

In the case that some malfunction is generated in one of the devices, the event logs correlated with the malfunction are sequentially pursued by a series of user operation procedures in FIG. 20, so that the true cause can easily be specified.

(e5: Drill Down Display)

Figure 21:
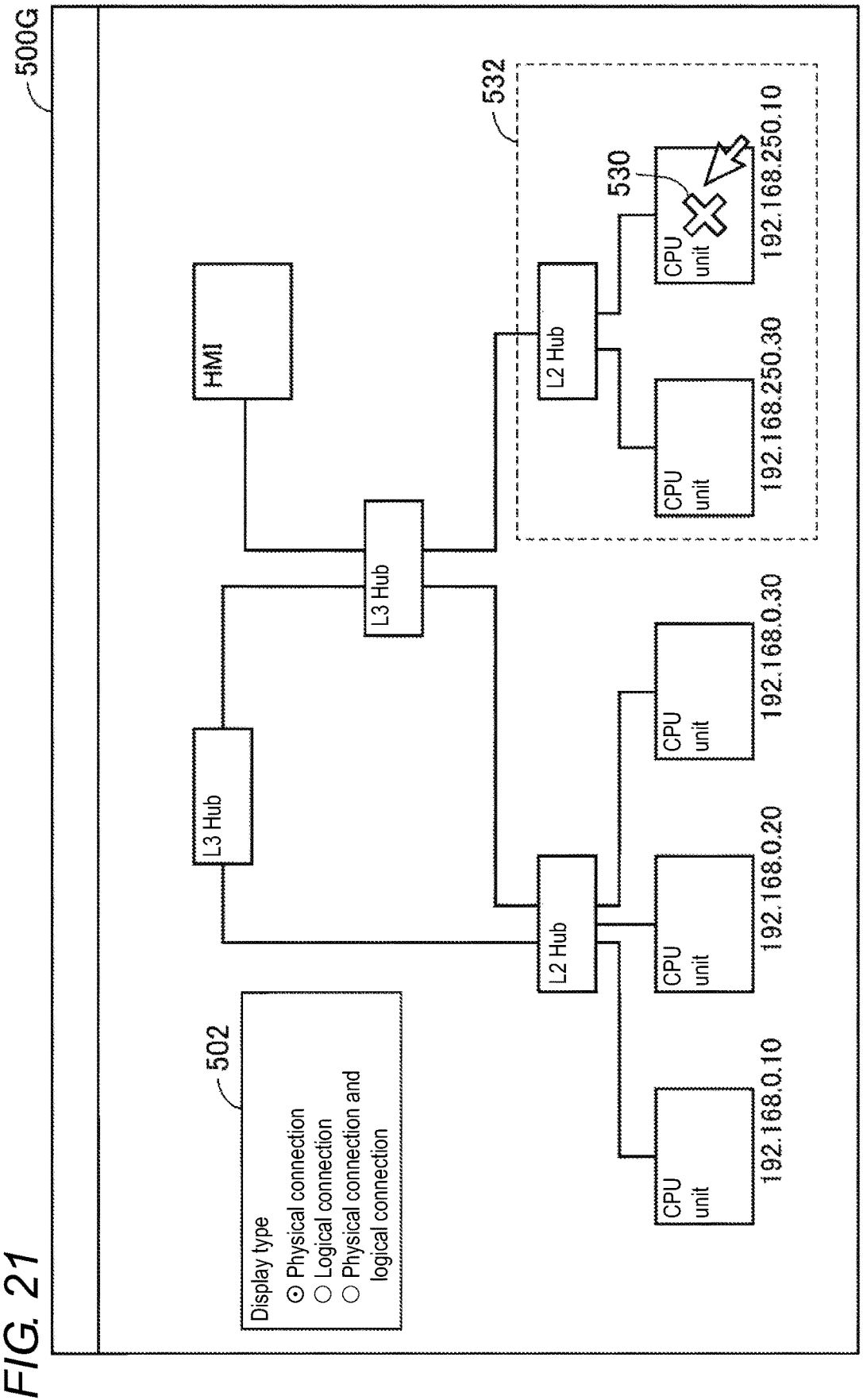
FIG. 21 is a view illustrating an example of a user interface screen related to drill down display provided by a control system according to an embodiment.
Figure 22:
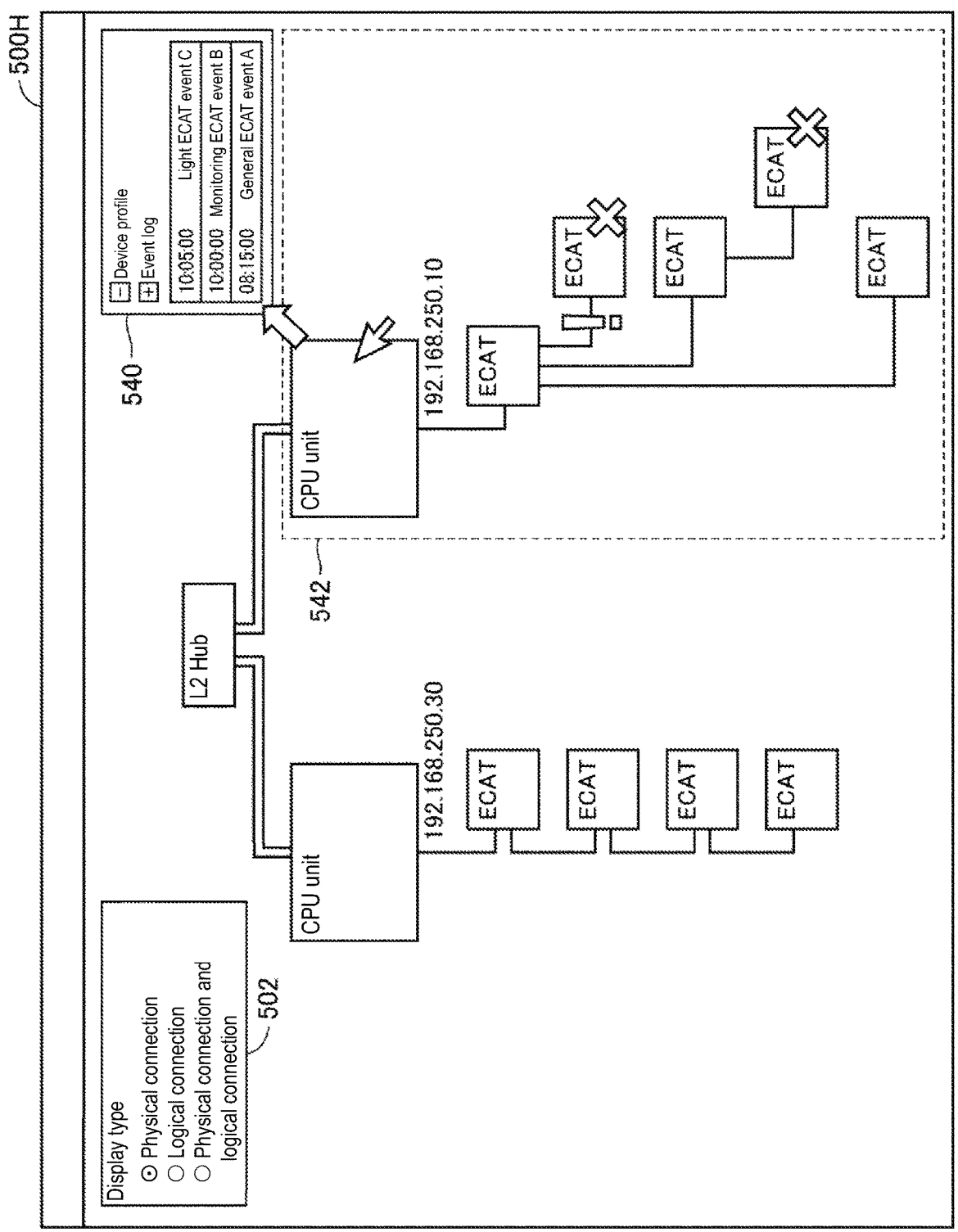
FIG. 22 is a view illustrating an example of a user interface screen related to drill down display provided by a control system according to an embodiment.
Figure 23:
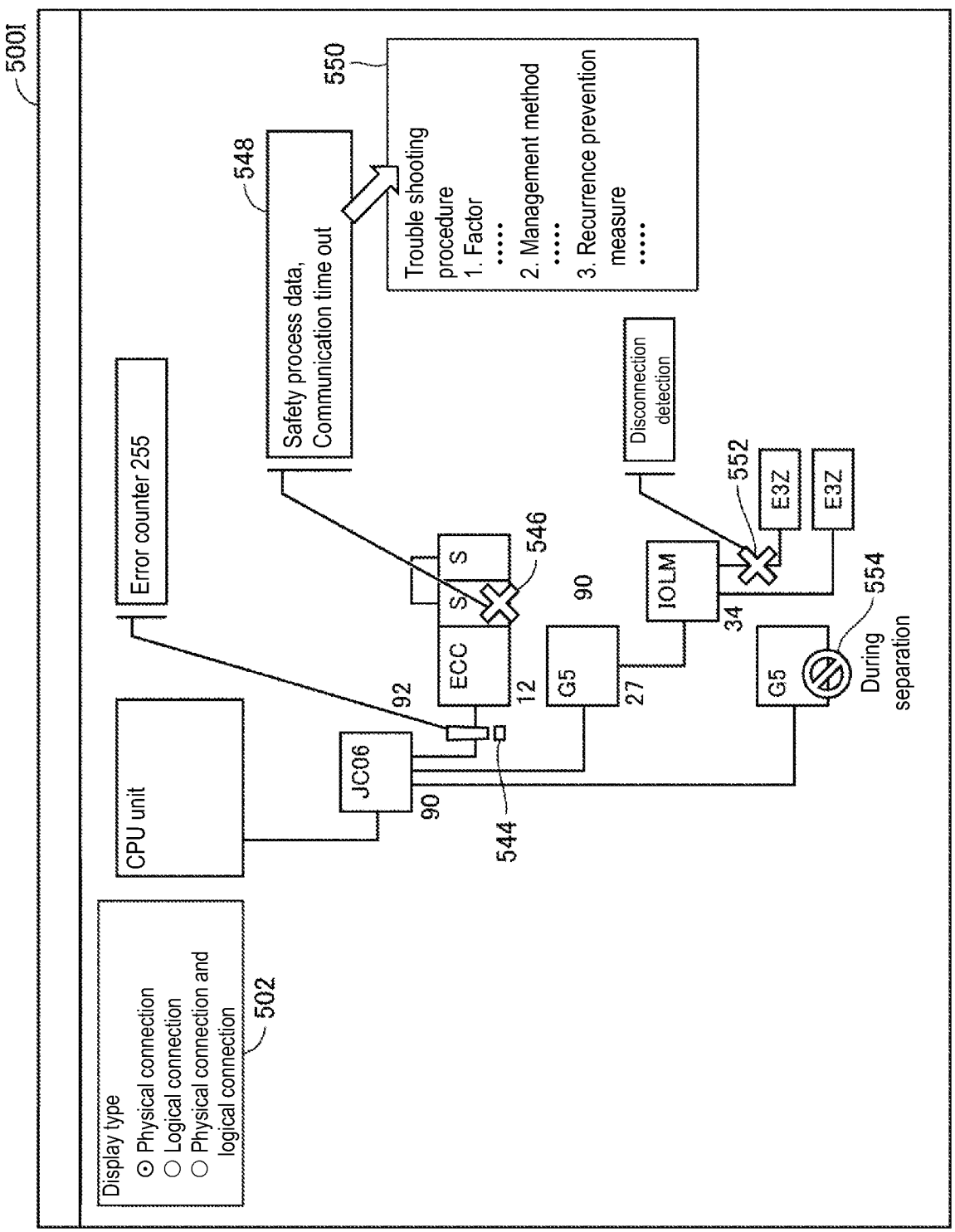
FIG. 23 is a view illustrating an example of a user interface screen related to drill down display provided by a control system according to an embodiment.

Drill down display may be provided in order to understand the event generated in the control system 1 and to support the investigation of the cause of the event. That is, in response to the user selection, the programmable terminal 200 may sequentially display only the configuration correlated with a selected range of the control system 1. FIGS. 21 to 23 are a view illustrating an example of the user interface screen related to the drill down display provided by the control system according to an embodiment.

A whole device constituting the control system 1 of the control monitoring target is schematically illustrated in a user interface screen 500G in FIG. 21. In the schematically-illustrated control system 1, an object 530 indicating an abnormality content may be displayed in the device in which the event such as some abnormality is generated. In the user interface screen 500G of FIG. 21, the abnormality is generated in the PLC located at the right end in FIG. 21. When the user selects the object 530 indicating the abnormality, the display of the control system 1 is enlarged with respect to the range (corresponding to a range 532 in FIG. 21) around the selected PLC as illustrated in FIG. 22.

The device of the slave node connected to the selected PLC through the network is also schematically illustrated in a user interface screen 500H of FIG. 22. When some event is generated in each device, an object indicating the content of the generated event may be displayed.

For example, when the user selects the object schematically indicating the PLC, a sub-window 540 including a profile of the selected PLC and the event log may be displayed. When the user selects the PLC located on the right side, the display of the control system 1 is enlarged with respect to the range (corresponding to a range 542 in FIG. 22) around the selected PLC as illustrated in FIG. 23.

The connection configuration and type of the remote I/O device connected to the selected PLC through the network is also schematically illustrated in a user interface screen 500I of FIG. 23. When some event is generated in each region (such as each functional unit), the object indicating the content of the generated event is displayed.

For example, an object 544 is displayed while correlated with an attention event generated in the network. When the object 544 is selected, the content of the event, namely, a message of "error counter: 255" indicating the number of times of the errors generated during the communication is displayed in the example of FIG. 23. Similarly, an object 552 is displayed while correlated with an abnormal event generated in the network. When the object 552 is selected, the content of the event, namely, a message of "disconnection detection" indicating that the communication line is disconnected is displayed in the example of FIG. 23.

An object 554 indicates a state in which the target device is temporarily separated from the network.

An object 546 is displayed while correlated with an abnormal event generated in the functional unit. When the object 546 is selected, the content of the event, namely, an object 548 of "safety process data communication time out" indicating that the data of the connection destination cannot be obtained is displayed in the example of FIG. 23. When the user selects the object 548, an object 550 indicating a troubleshooting procedure for the generated abnormal event is displayed.

The generated abnormality and the troubleshooting procedure for the abnormality are previously stored, and are searched and displayed based on an event code of the generated event.

For convenience of description, FIG. 23 illustrates a form in which all the pieces of information are displayed at once. However, the pieces of information may be displayed in any timing.

As illustrated in FIGS. 21 to 23, the drill down display is adopted in which display content is sequentially fined down from the user interface screen taking a general view of the whole control system of the control and monitoring target according to the user selection, so that the investigation of the cause of some event generated in the control system can be facilitated.

F. Processing Procedure

Figure 24:
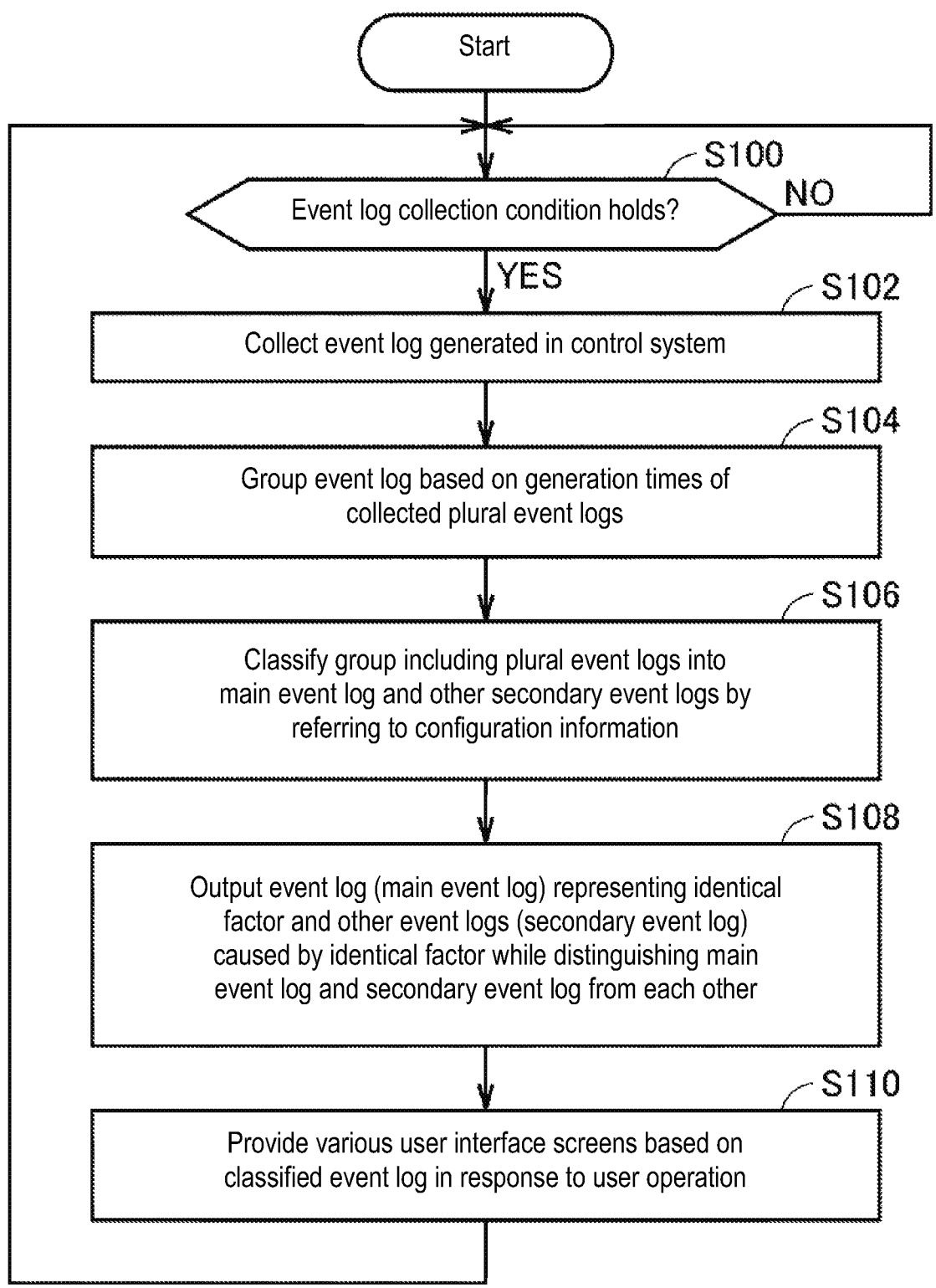
FIG. 24 is a flowchart illustrating a processing procedure of an event log collection and extraction function according to an embodiment.

A processing procedure of the event log collection and extraction function of an embodiment will be described below. FIG. 24 is a flowchart illustrating the processing procedure of the event log collection and extraction function of an embodiment. Typically, the programmable terminal 200 executes the previously-installed information processing program (HMI program 209 in FIG. 2), thereby performing each step in FIG. 24.

Referring to FIG. 24, when a predetermined event log collection condition holds (YES in step S100), the programmable terminal 200 collects the event log generated in the target control system (step S102). When the predetermined event log collection condition does not hold (NO in step S100), the processing in step S100 is repeated. The event log collection condition may be whether a predetermined cycle is coming or whether the event log is received from one of the devices constituting the control system.

Then, the programmable terminal 200 extracts at least one event log caused by the identical factor from the collected plural event logs, and specifies the event log representing the event logs caused by the identical factor from the extracted event log. Specifically, the programmable terminal 200 groups the event log based on the time the collected plural event logs are generated (step S104). The group including the plural event logs is classified into the main event log and other secondary event logs by referring to the configuration information (step S106).

In response to the user operation, the programmable terminal 200 outputs the event log (main event log) representing the identical factor and other event logs (secondary event logs) caused by the identical factor while distinguishing the event log (main event log) and other event logs (secondary event logs) from each other (for example, the user interface screen 550 in FIG. 14) (step S108).

In response to the user operation, the programmable terminal 200 provides various user interface screens based on the event logs classified in step S106 (step S110). The pieces of processing subsequent to step S100 are repeated.

G. Modifications

In the above embodiments, by way of example, the programmable terminal 200 performs all the pieces of processing necessary for the event log collection and extraction function. Alternatively, the programmable terminal 200 may perform the pieces of necessary processing in cooperation with another device (for example, each PLC connected to the network) or in cooperation with a high-order server device. The high-order server device may perform all the pieces of necessary processing by itself, or the PLC acting as the master node may perform all the pieces of necessary processing.

Alternatively, in the case that the necessary information is presented onto the terminal device 400 such as a tablet as illustrated in FIG. 1, a function that performs the necessary processing may be mounted on at least a part of the terminal device 400 and gateway server 300.

In the event log collection and extraction function of an embodiment, any mounting form can be adopted according to the configuration of the target control system, information processing performance of the control system, and a communication ability, a required speed, and a required secure level of the network.

H. Summary

One or more embodiments can solve the following problems.

First, as described above with reference to FIGS. 4 to 6, and 8, the plural events are generated arising from the identical factor, and sometimes a large amount of event logs are generated at the substantially same time according to the plural events. Advanced knowledge and a verification time are required to narrow the problem from a large amount of generated event logs to specify the factor. Particularly, an environment in which plural applications are concurrently executed in the control system including at least one network is achieving with the advance of the network technology. In such environments, because each application detects the abnormality caused by the identical factor, the number of generated event logs tends to increase when some abnormality or malfunction is generated.

The investigation of the cause generating the large number of event logs can be facilitated by applying the event log collection and extraction function of an embodiment to the large number of simultaneously-generated event logs.

Second, it is necessary to analyze the troubleshooting of the abnormality generated in the network with a combination of pieces of information such as the physical connection (topology configuration), the logical connection (the connection relationship between the master and the slave), and the generation time relationship. Particularly, it is necessary to study the troubleshooting of the abnormality from both the physical connection and the logical connection. There is a limit to the study of the relationship between the physical connection and the logical connection only when the list of event logs is displayed. It is necessary for the user to consider various pieces of necessary information in addition to the content of the event log. However, the pieces of necessary information except for the event log disperse, and it is difficult to integrate and study the pieces of necessary information.

Regarding such the problems, in the user interface provided by the control system of an embodiment, the visualization is achieved such that both the physical connection and the logical connection can be understood at a glance, and the detected event (event log) is visually displayed while correlated with the visualized physical connection and logical connection. When the information necessary for the investigation of the cause is visualized and unitarily provided to the user, the investigation of the cause can be facilitated in generating some abnormality or malfunction.

Third, in the case that the abnormality or malfunction related to the plural control devices is generated, it is necessary to diagnose the related plural devices across the network. Although a general trouble analysis tool cannot understand the state of the single device, the control system of an embodiment provides the user interface screen that displays the whole or a part of the state or the generated event log of the control system extending over the plural devices. Even in the abnormality or malfunction related to the plural devices, the factor can easily be specified by referring to the user interface screen.

The disclosed embodiments are illustrative in all respects, and are not restrictive. The scope of the present invention is indicated not by the above description but by the claims, and it is intended that the meanings equivalent to the claims and all the changes within the scope of the present invention are included in the scope of the present invention.

The invention claimed is:

1. An information processing device comprising a processor configured with a program to perform operations comprising:

operation as a collection unit configured to collect a plurality of event logs corresponding to a plurality of events in a control system comprising at least one network;

operation as an extraction and specification unit configured to:

group the plurality of event logs into at least one group, each group comprising at least one event log such that each event, from among the plurality of events, corresponding to each event log in the group, arises from an identical factor by grouping the plurality of event logs such that each group comprises: one event log; or event logs having generation times that are close to each other; and specify, for each group, a main event log from among the at least one event log in the group, the main event log corresponding to an event representing the identical factor; and operation as an output unit configured to output, for each group:

the main event log; and in response to the group comprising a plurality of event logs, at least one secondary event log corresponding to other events arising from the identical factor while distinguishing the main event log and the at least one secondary event log from each other, wherein the processor is configured with the program such that each of the plurality of event logs are issued according to at least one of: an abnormality of hardware constituting the control system; an abnormality of the at least one network included in the control system; and an abnormality of an application executed by the control system.

2. The information processing device according to claim 1, wherein the processor is configured with the program such that operation as the output unit comprises operation as the output unit that, for each group, displays only the main event log.

3. The information processing device according to claim 2, wherein the processor is configured with the program such that operation as the output unit comprises operation as the output unit that, for each group, in response to a selection of the main event log, outputs the at least one secondary event log.

4. The information processing device according to claim 3, wherein the processor is configured with the program such that operation as the output unit comprises operation as the output unit that, for each group, hierarchically expresses the main event log and the at least one secondary event log.

5. The information processing device according to claim 1, wherein the processor is configured with the program such that operation as the extraction and specification unit comprises operation as the extraction and specification unit that, for each group, specifies the main event log based on a network configuration of the control system.

6. The information processing device according to claim 1, wherein each of the plurality of event logs comprises a content of the corresponding event, a generation time of the corresponding event, and a generation source of the corresponding event.

7. A non-transitory computer-readable storage medium storing an information processing program executed by a computer connected to a control system comprising at least one network, the information processing program causing a computer to perform operations comprising:

collecting a plurality of event logs corresponding to a plurality of events in the control system;

grouping the plurality of event logs into at least one group, each group comprising at least one event log such that each event, from among the plurality of events, corresponding to each event log in the group arises from an identical factor by grouping the plurality of event logs such that each group comprises: one event log; or event logs having generation times that are close to each other;

specifying, for each group, a main event log from among the at least one event log in the group, the main event log corresponding to an event representing the identical factor; and outputting, for each group:
the main event log; and
in response to the group comprising a plurality of event logs, at least one secondary event log corresponding to other events arising from the identical factor while distinguishing the main event log and the at least one secondary event log from each other, wherein the processor is configured with the program such that each of the plurality of event logs are issued according to at least one of: an abnormality of hardware constituting the control system; an abnormality of the at least one network included in the control system; and an abnormality of an application executed by the control system.

8. An information processing method performed by an information processing device connected to a control system comprising at least one network, the information processing method comprising:

collecting a plurality of event logs corresponding to a plurality of events in the control system;

grouping the plurality of event logs into at least one group, each group comprising at least one event log such that each event, from among the plurality of events, corresponding to each event log in the group arises from an identical factor by grouping the plurality of event logs such that each group comprises: one event log; or event logs having generation times that are close to each other;

specifying, for each group, a main event log from among the at least one event log in the group, the main event log corresponding to an event representing the identical factor; and outputting, for each group:
the main event log; and
in response to the group comprising a plurality of event logs, at least one secondary event log corresponding to other events arising from the identical factor while distinguishing the main event log and the at least one secondary event log from each other, wherein each of the plurality of event logs are issued according to at least one of: an abnormality of hardware constituting the control system; an abnormality of the at least one network included in the control system; and an abnormality of an application executed by the control system.

9. The method according to claim 8 further comprising outputting, for each group, only the main event log.

10. The method according to claim 9, further comprising outputting, for each group, in response to a selection of the main event log, the at least one secondary event log.

11. The method according to claim 10, further comprising, for each group, hierarchically expressing the main event log and the at least one secondary event log.

12. The method according to claim 8, wherein specifying, for each group, the main event log comprises specifying, for each group, the main event log based on a network configuration of the control system.

13. The method according to claim 8, wherein each of the plurality of event logs comprises a content of the corresponding event, a generation time of the corresponding event, and a generation source of the corresponding event.

* * * * *